UNITED STATES PATENT OFFICE

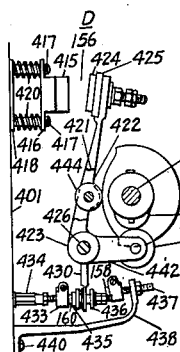

JACOB D. LEWIS, OF YONKERS, NEW YORK, BENJAMIN N. JONES, OF GLEN RIDGE, NEW JERSEY, AND ARTHUR H. SCHLAF, OF YONKERS, NEW YORK, ASSIGNORS TO OTIS ELEVATOR COMPANY, OF JERSEY CITY, NEW JERSEY, A CORPORATION OF NEW JERSEY

CONTROL SYSTEM

Application filed July 27, 1926. Serial No. 125,194.

The invention relates to control systems for alternating current motors, particularly of the multi-speed induction type; and more particularly to the control of such motors in elevator systems.

The principal object of the invention is to provide a control for alternating current motors which is quiet, uniform and reliable in operation and which insures smooth starting and stopping at high operating efficiency.

One feature of the invention is to cause voltage of low value to be applied to the motor upon starting and for causing a gradual increase in the value of the applied voltage so that a smooth starting operation is obtained.

Another feature involves changing to lower speed motor connections and for causing voltage of low value to be applied to the motor upon stopping, and for thereafter causing a gradual increase in the value of the applied voltage so that a smooth retarding operation is obtained.

Still another feature is the provision of relatively movable inductively related windings for causing the above changes in the value of the applied voltage.

Other features and advantages will become apparent from the following description and appended claims.

The invention will be described, by way of illustration, as applied to a two-speed induction motor having two separate stator or primary windings of different pole numbers, with the motor employed in an elevator system for raising and lowering the elevator car. It is to be understood, however, that the invention is also applicable to induction motors of other numbers of speeds and those wherein the change in the speed is effected by changing the connections for a single winding to obtain a change of pole number. Furthermore, the motor may be arranged in other types of systems. In the elevator system illustrated, both the starting and the stopping of the elevator car are controlled by a car switch and the accuracy of the stop is dependent upon the skill of the operator. The invention, however, is applicable to other elevator systems, such as those in which push botton control is employed for causing both the starting and the stopping of the car, or those in which the starting of the car is under the control of an operator while the slow down and stopping is automatic. Also, the invention is applicable to elevator systems in which self-leveling mechanism is employed.

The invention involves utilizing the principles employed in induction regulators. In such regulators the voltage induced in one of two inductively related relatively movable windings is caused to cooperate with the voltage of the other winding to regulate the voltage applied to a load. In the present invention, to start the motor, this induced voltage is caused to add algebraically or vectorially to the source voltage in such manner that the voltage applied to the motor is of low value. Relative movement of the inductively related windings is then caused with the result that the value of the applied voltage is gradually increased. Thus a smooth starting operation is effected. In stopping, the motor connections are changed from fast to slow speed, causing regenerative braking of the motor. The inductively related windings cause the voltage applied to the motor for slow speed to be of low value at the instant of this change and then gradually increased. Thus the motor excitation is gradually increased for the braking action, resulting in smooth retardation.

The induction regulator is preferably constructed with a wound stator and a wound rotor, the latter being adapted for rotative movement through approximately 180 electrical degrees in either direction from a neutral point. Rotative movement of the induction regulator rotor is effected by a separate motor which, when it moves the rotor in one direction, causes the elevator motor to be connected for fast speed operation and, when it moves the rotor in the other direction, causes the elevator motor to be connected for slow speed operation. Transformers may be advantageously employed in conjunction with the induction regulator to obtain the desired value of voltage for operation of the elevator motor.

In the drawings:

Figure 5 is a slightly enlarged detail of the direction switch, with parts broken away, taken along line 5—5 of Figure 2;

Figure 6 is a slightly enlarged detail of a maintaining ring and contacts, taken along line 6—6 of Figure 2;

Figure 7 is a slightly enlarged detail of an interlock ring and contacts, taken along line 7—7 of Figure 2;

Figure 8 is a slightly enlarged detail of a reversing ring and contacts, taken along line 8—8 of Figure 2;

Figure 9 is a slightly enlarged detail of the torque motor resistance switch, taken along line 9—9 of Figure 2;

Figure 10 is a slightly enlarged detail of the running switch, taken along line 10—10 of Figure 2;

Figure 11 is a slightly enlarged detail of the fast speed return switch, taken along line 11—11 of Figure 2;

Figure 12 is a slightly enlarged detail of the neutral switch, taken along line 12—12 of Figure 2;

Figure 13 is a slightly enlarged detail of the slow speed switch, taken along line 13—13 of Figure 2;

Figure 14 is a slightly enlarged detail of the slow speed return switch, taken along line 14—14 of Figure 2;

Figure 15 is a slightly enlarged detail of the fast speed switch, taken along line 15—15 of Figure 2;

Figure 1:
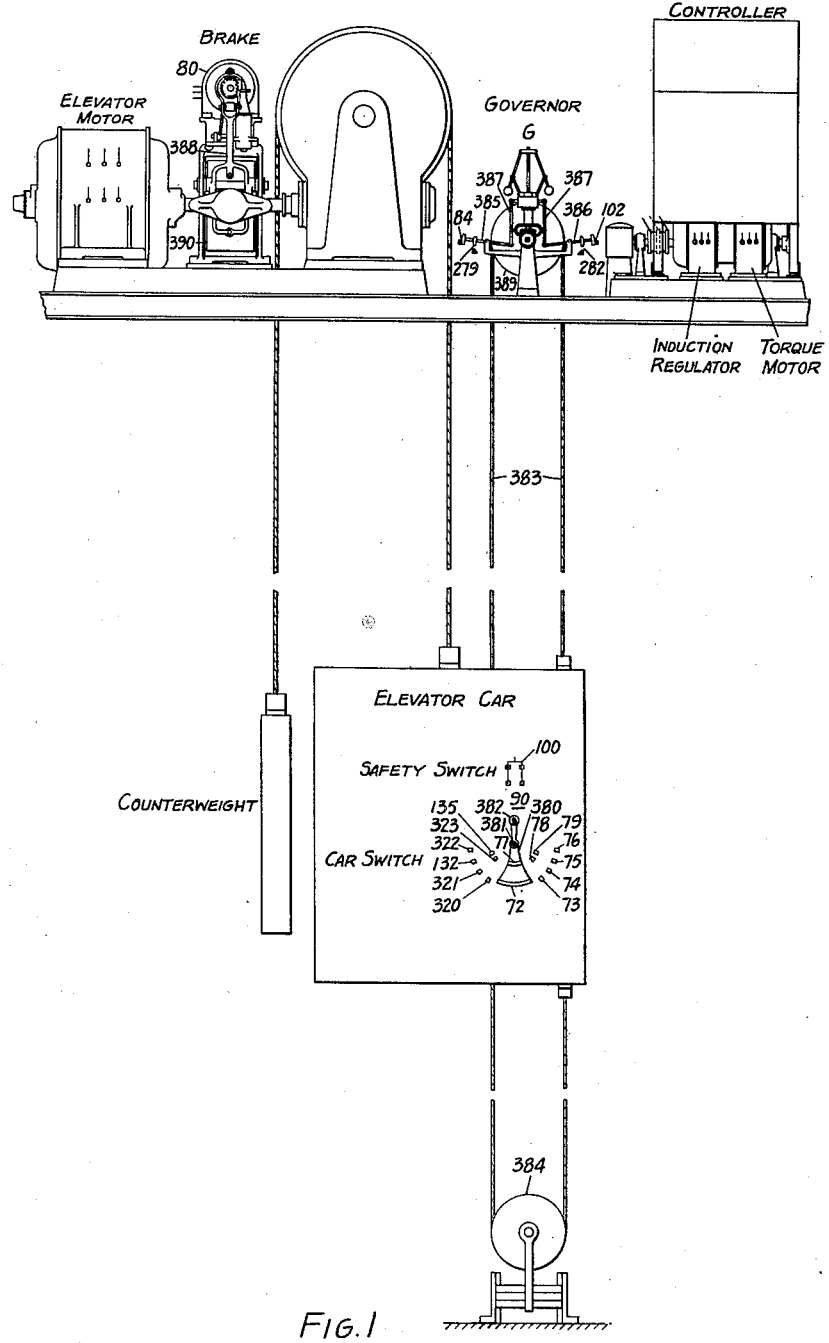
Figure 1 is a simplified schematic representation of an elevator system.

For a general understanding of the invention, reference may be had to Figure 1 wherein various parts of the system are indicated by legend. The elevator car and counter-weight are driven by the elevator motor through a worm and gear driving connection to the driving sheave. The starting and stopping of the car is controlled by the car switch in the car. The induction regulator controls the voltage applied to the windings of the elevator motor during the starting and stopping operations. The torque motor causes rotative movement of the induction regulator rotor to cause a gradual change in the value of the voltage applied to the elevator motor windings. The brake is employed to bring the elevator motor to a stop. The governor causes the operation of the governor switch to effect certain control operations. The safety switch is employed to cause the stopping of the elevator car in case of an emergency. The controller comprises a plurality of control switches mounted on the control panel.

The car switch comprises two sets of up contacts and two sets of down contacts. The lower set of up contacts comprises contacts 73, 74, 75 and 76 while the upper set comprises contacts 78 and 79. The lower set of down contacts comprises contacts 320, 321, 132, and 322 while the upper set comprises contacts 323 and 135. A contact segment 72 for bridging the contacts of each lower set and a contact segment 77 for bridging the contacts of each upper set are mounted on the segmental support 380 of insulating material. The segmental support is pivoted at 381 and is provided with an operating handle 382. It is preferred to provide centering springs (not shown) to cause the car switch to be returned to off position when released by the operator.

The governor is driven by the governor rope 383. This rope is connected at one end to the top of the car and extends upwardly over the governor sheave 389, thence downwardly to and around the tension sheave 384 and thence upwardly to the bottom of the car where the other end is connected. The switch which the governor operates is designated by the reference character G. The switch comprises four pairs of cooperating contacts 84, 279, 282 and 102. The movable contacts of contacts 84 and 279 are carried by lever 385 while the movable contacts of contacts 282 and 102 are carried by lever 386. These levers are operated by links 387.

The brake is illustrated as operated by a motor 80. Upon energization of this motor, the brake operating levers 388 are moved to cause the release of the brake shoes 390 from the brake drum against the force of the actuator springs. Upon deenergization of the motor, the brake shoes are applied by the actuator springs. Other types of brakes may be employed if desired.

Figure 2:
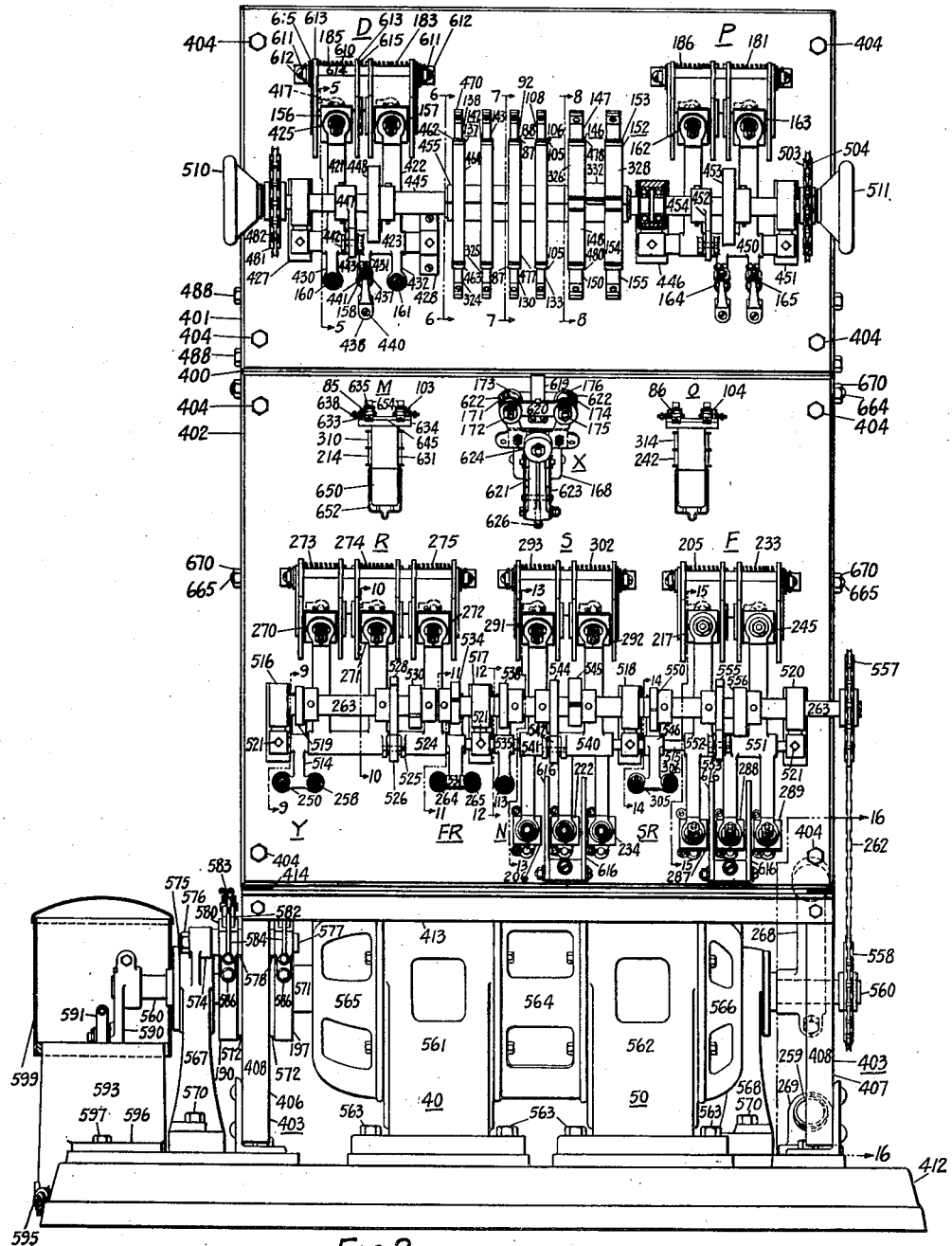
Figure 2 is a front elevation of the controller and induction regulator, with parts in section.
Figure 3:
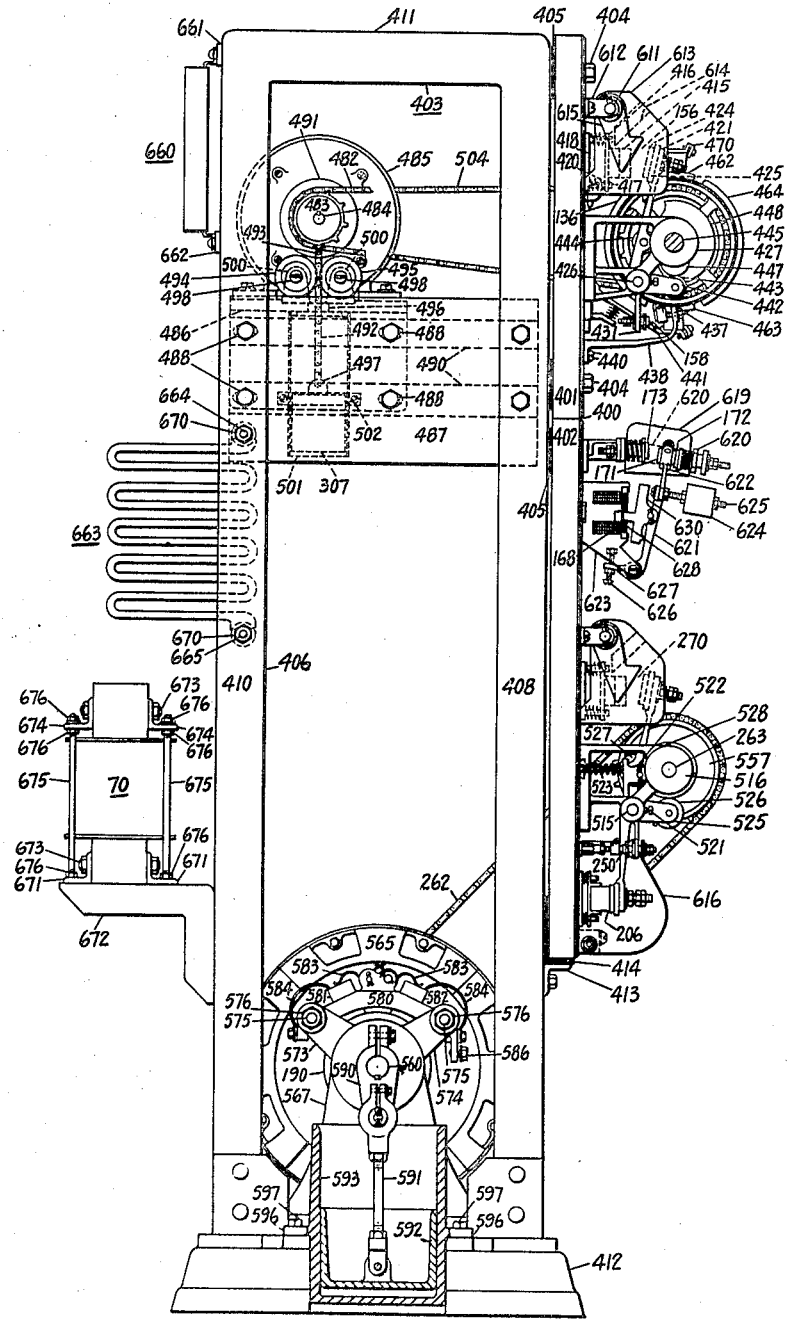
Figure 3 is a side view of the same, with parts omitted and parts in section.
Figure 4:
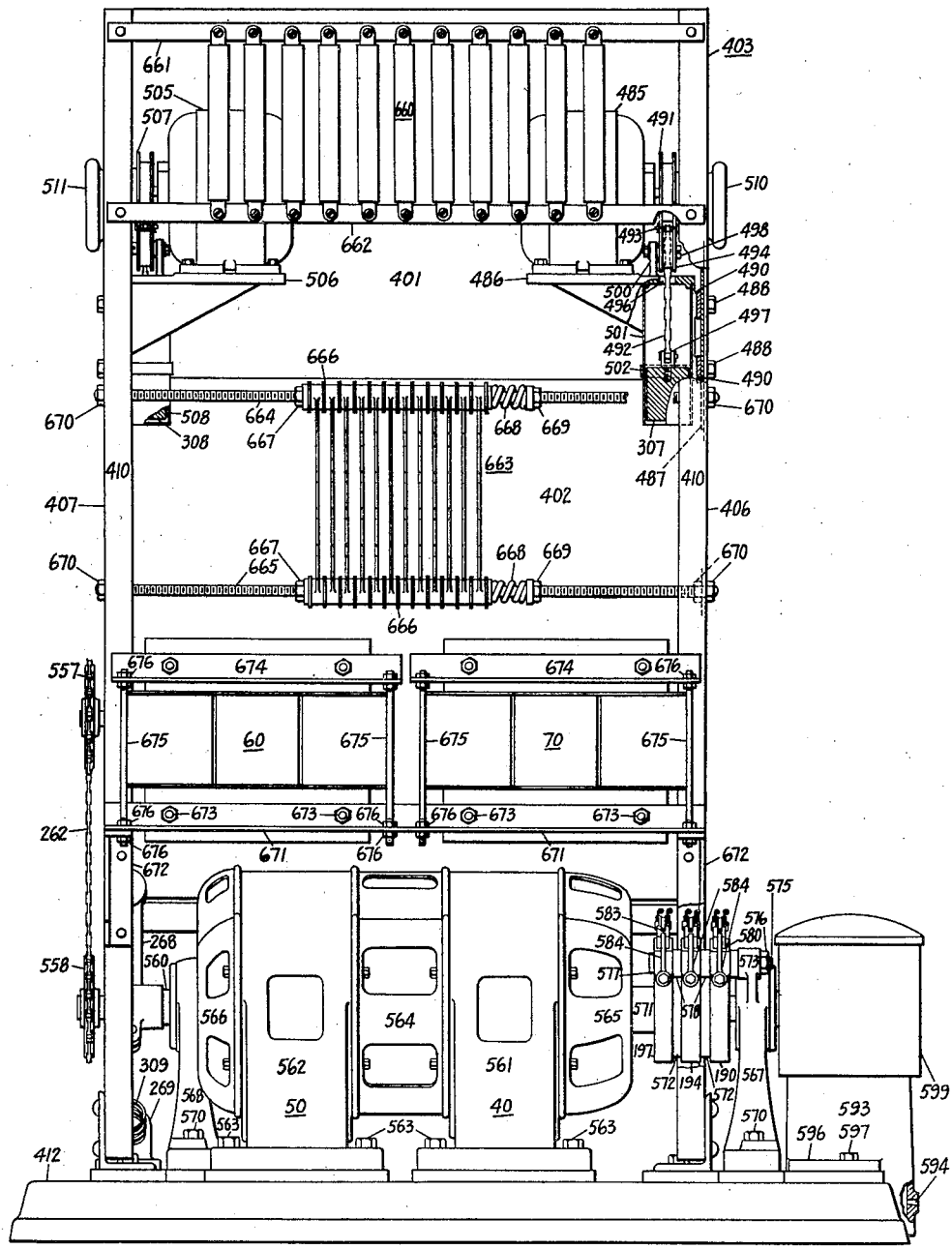
Figure 4 is a rear view of the same, with parts broken away.

Referring to Figures 2, 3 and 4, the details of the controller will be described. The control panel 400 of the controller is divided into two sections 401 and 402. These sections are secured to the controller frame 403 as by bolts 404. Spacers 405 of rubber are provided between the sections and frame to take care of any unevenness of surface. The controller frame comprises two upright sections 406 and 407. Each of these sections comprises a front upright 408, a rear upright 410 and a top connecting portion 411. These controller frame sections are secured to the bed plate 412 by angles secured to the uprights and to pads formed on the bed plate. These upright sections are joined at various intervals to secure rigidity of construction. The angle bracket 413 joins the front uprights of each frame section and in addition forms a support for the lower panel section 402. It is to be noted that the lower rubber spacers (as illustrated by spacer 414 in Figure 3) are extended so as to be between the bottom of panel section 402 and the angle bracket. The panel sections themselves join the front uprights of the frame sections above angle bracket 413. The manner in which the remainder of the frame sections are joined will be seen as the description proceeds.

Referring to the upper portion of the controller, the details of the various parts of the direction switch D and potential switch P will now be described. The direction switch is provided with power contacts 156 and 157 and auxiliary contacts 158, 160 and 161. As seen in Figure 5, the stationary contact 415 of power contacts 156 is carried by the contact holder 416. This contact holder is loosely mounted on supports 417 formed on plate 418. Springs 420 tend to maintain the stationary contact in its extended position. The terminal stud (not shown) for the contact is also employed to secure plate 418 to the panel section 401 while the plate is connected to the contact holder by a flexible conductor (also not shown). The construction and arrangement of the stationary contact of power contacts 157 is the same. The movable contacts of these power contacts are carried by the arms 421 and 422 of operating lever 423. As illustrated in Figure 5 for movable contact 424 of power contacts 156, this contact is insulated from arm 421 by the insulating block 425 through which the stem of the contact extends. Binding nuts are provided on the contact stem for connecting the movable contact in the system. The construction and arrangement of the movable contact of power contacts 157 is the same.

Operating lever 423 is pivotally mounted on shaft 426. This shaft is supported by brackets 427 and 428 and is positioned therein as by set screws, as illustrated in Figure 2. Spacing collars are provided on shaft 426 between the lever and the brackets. In addition to the upwardly extending arms 421 and 422, lever 423 is formed with three depending arms 430, 431 and 432. These arms carry the movable contacts of auxiliary contacts 158, 160 and 161. The construction and arrangement of auxiliary contacts 160 and 161 is the same, that of contacts 160 being illustrated in Figure 5. The stationary contact 433 of contacts 160 is adjustably secured to contact support 434, the support being provided with a threaded portion (not shown) which extends through the panel and is provided with nuts at the rear thereof for securing the support to the panel and for connecting the contact in the system. The movable contact 435 of contacts 160 is insulated from arm 430 by a bushing 436 through which the contact stem extends. Binding nuts are provided on the contact stem for connecting the contact in the system. When contacts 160 are separated, the movable contact is extended toward the stationary contact by a contact spring.

The construction of auxiliary contacts 158 is most clearly illustrated in Figure 3. The construction of the stationary contact 437 of auxiliary contacts 158 is the same as that of stationary contact 433. This contact, however, is adjustably mounted in support 438 to extend inwardly toward the panel. This support is secured to the panel section as by a screw 440, the screw extending through the panel and being provided with binding nuts for connecting the contact in the system. The construction of movable contact 441 of contacts 158 is the same as that of movable contact 435, the contact facing outwardly from the panel, however, so as to engage contact 437.

Lever 423 is also provided with another arm 442. This arm is forked, as shown in Figure 2, and extends outwardly from the panel to support a roller 443. This roller is pivotally mounted on a shaft, secured to the arm as by pinning to one of the forks. Another roller 444 is provided for this lever, this roller being pivotally mounted on a shaft extending between arms 421 and 422 and secured to arm 422.

The lever is operated by cams mounted on shaft 445. This shaft is supported at the left (as viewed in Figure 2) by a bearing provided in bracket 427 and at the right by a bearing provided in bracket 446. Cam 447 is positioned on the shaft, as by a pin, so that its camming surface engages the face of roller 443 and cam 448 is positioned on the shaft in a similar manner so that its camming surface engages the face of roller 444.

The potential switch is similarly provided with power contacts 162 and 163 and with auxiliary contacts 164 and 165. The construction and arrangement of the power contacts is the same as that of the direction switch power contacts. The construction and arrangement of the auxiliary contacts is the same as that of direction switch auxiliary contacts 158. As only two of these auxiliary contacts are provided, the operating lever 450 is provided with only two depending arms. The pivot shaft for lever 450 is supported by brackets 446 and 451 and, as in the case of shaft 426, this shaft is positioned in the brackets by set screws. The potential switch operating cams 452 and 453 are of the same construction as direction switch operating cams 447 and 448 respectively and are positioned by pins on shaft 454 for cooperation with their respective rollers. Shaft 454 is supported at the left by a bearing provided in bracket 446 and at the right by a bearing provided in bracket 451.

Between cam 448 and bracket 446, a portion of direction switch cam shaft 445 is arranged with square cross section. An insulating bushing 455 extends axially of the shaft substantially the full length of the squared portion. Upon this bushing are secured a plurality of circuit controlling rings. Two of these rings, designated 137 and 142, control holding circuits for the direction and potential switch operating motors, as will be explained later, and are termed maintaining rings. Two others of these rings, 88 and 106, serve as electrical interlocks for the direction and potential switches and are termed interlock rings. The remaining two of these rings, 146 and 152, are for determining the direction of rotation of the elevator motor and are termed reversing rings.

The construction and arrangement of the maintaining rings is identical, that for ring 137 being illustrated in Figure 6. Referring to this figure, the ring is secured to cam shaft 445 by a clamp member 456 formed on the hub 457. The jaws of this clamp member are drawn together so as to tighten the hub upon the insulating bushing 455 by a screw 458. Spokes extend from the hub of the ring to a rim 460. An insulating ring 461 is provided around the outside of the rim and a plurality of contact segments are provided on the outside of the insulating ring. These segments are designated 136, 462, 463 and 464. They are secured to the rim as by screws 465 passing from the inside of the rim through the insulating ring into the segments. In order that proper circuit connections may be obtained, segments 136, 462, and 463 are completely insulated from the rim by bushings 466 provided on screws 465.

The feed contact 140 for maintaining ring 137 is slidably supported in the contact holder 467. This contact is pressed against segment 136 by a spring (not shown). The contact is connected by a flexible conductor (also not shown) to binding nuts on one of the screws 468 at the rear of the panel. These screws also serve to secure the contact holder 467 to the panel.

Two other contacts 138 and 324 are provided for this ring. With the direction switch in off position, contact 138 rests on segment 462 and contact 324 rests on segment 463. Contact 138 is carried by the contact arm 470, being fastened thereto by means of a retaining clip 471 and screw 472. The contact arm is pivotally mounted on a shaft supported by bracket 473. Contact 138 is pressed in engagement with the ring segments by means of spring 474 extending between the arm and a projection formed on the bracket. The arm is connected by a flexible conductor 475 to the screw 476, the screw extending through the panel and being provided with binding nuts (not shown) at the rear thereof for connecting the contact in the system. The construction and arrangement of the contact arm and associated parts for contact 324 is the same as described for contact 138 except that they are inverted.

The construction and arrangement of each of the interlock rings is the same, that for ring 88 being illustrated in Figure 7. Referring to this figure, the construction and arrangement of the ring is the same as that described for maintaining ring 137 except that the three segments 136, 462 and 463 are replaced by a single segment 87. This segment is secured by three screws provided with insulating bushings. The remaining segment 477 is identical with segment 464 of ring 137 and, as in the case of that segment, the insulating bushings for its securing screws are omitted. Three contacts 91, 92 and 130 are provided for ring 88, the construction and arrangement of these contacts and their associated parts being the same as that described for contacts 140, 138, and 324 respectively for ring 137. With the direction switch in off position, these contacts are in engagement with segment 87 as illustrated.

The construction and arrangement of each of the reversing rings is the same, that for ring 146 being illustrated in Figure 8. The construction and arrangement of this ring is the same as that of ring 137 with the exception that two segments 145 and 327 are provided instead of segment 136 and two segments 148 and 326 are provided instead of segment 464. Also the arrangement of the securing screws and insulating bushings is somewhat modified. The remaining segments of this ring, 478 and 480, as in the case of the corresponding segments 462 and 463 of ring 137, are secured by screws provided with insulating bushings. Segments 145 and 148 are secured to the rim by screws without insulating bushings. Thus these segments are electrically connected. Insulating bushings are provided for segments 326 and 327, however, and in addition, a stud and lock nut are employed in lieu of one of the securing screws for each segment to permit the connection of conductor strap 332 to segment 326 and conductor strap 331 to segment 327. These conductor straps extend to reversing ring 152, as indicated by strap 332 in Figure 2, where they are similarly connected to the corresponding segments of that ring. No feed contacts are employed for the reversing rings but contacts and their associated parts of the same arrangement and construction as that described for contacts 138 and 324 for ring 137 are provided, these contacts for reversing ring 146 being designated 147 and 150. With the direction switch in off position, these contacts are in engagement with segments 478 and 480.

As illustrated in Figure 2, a sprocket wheel 481 is mounted on direction switch cam shaft 445 at the left of bracket 427. This sprocket wheel is provided with a sprocket chain 482 which extends through panel section 401 to the rear thereof. As shown in Figure 3, this chain passes over sprocket wheel 483, keyed to the shaft 484 of the direction switch operating motor 485. This motor is mounted on a bracket 486 adjustably secured to the plate 487 as by bolts 488. Separating strips 490 are provided between the plate and the bracket. Two of the bolts 488 extend through the rear upright 410 of frame section 406 to secure the plate to this upright in addition to securing the motor supporting bracket to the plate. Similar bolts are provided for securing the plate to front upright 408. In addition to acting as a support for the motor bracket, this plate also acts to assist in securing rigidity of construction of the controller frame.

A pulley 491 is secured to motor shaft 484 between sprocket wheel 483 and the motor frame, being positioned by the same key employed for the sprocket wheel. A roller chain 492 is secured to this pulley by a pin 493. The chain extends downwardly between two guide pulleys 494 and 495 through an aperture 496 formed in bracket 486. At its lower end this chain is secured, as by a pin, to a forked member 497 threaded into the weight 307. The pulleys 494 and 495 are rotatably mounted on shafts 498 secured to projections 500 formed on the motor supporting bracket. The weight 307 is arranged within a cylinder 501, open at its bottom end. Clearance is provided between the weight and the barrel of the cylinder. The cylinder is secured to the motor bracket 486 by a strap 502, being positioned at the top by a seat formed on the bottom of the bracket.

A similar arrangement is provided for the potential switch. As illustrated in Figure 2, a sprocket wheel 503 is mounted on potential switch cam shaft 454 at the right of bracket 451. The sprocket chain 504 for this sprocket wheel passes through panel section 401 to the rear thereof and around a sprocket wheel (not shown) similar to direction switch sprocket wheel 483, keyed to the shaft of the potential switch operating motor 505. As partially illustrated in Figure 4, this motor is mounted on bracket 506 secured to a plate, similar to plate 487, extending between the uprights of frame section 407. A pulley 507 is mounted on the motor shaft and, as in the case of pulley 491, is provided with a roller chain. This chain passes between guide pulleys and is secured to a weight 308 at its bottom end. The cylinder 508 for weight 308, as distinguished from cylinder 501, is closed at its bottom end.

Before proceeding with the description of the remainder of the controller, the operation of the direction and potential switches will be described. As will be seen from later description, the direction and potential switch operating motors are energized simultaneously upon the shifting of the car switch to a starting position. Assume that these motors have been energized for up operation of the elevator car. The direction switch operating motor, driving through sprocket wheel 483, chain 482 and sprocket wheel 481, causes rotative movement of the direction switch cam shaft 445 in the clockwise direction, as viewed in Figures 3, 5, 6, 7 and 8. During the first part of this movement, segments 136 and 464 of maintaining ring 137 engage contacts 138 and 324 respectively, and slightly later, segment 462 disengages contact 138 and segment 463 disengages contact 324. Thus segment 136 bridges feed contact 140 and contact 138. A similar operation occurs as regards the corresponding segments and contacts for maintaining ring 142. At the same time that segments 462 and 463 disengage contacts 138 and 324, segment 87 of interlock ring 88 disengages contact 130, thus breaking the connection between feed contact 91 and contact 130. A similar operation takes place as regards the corresponding segment and contact for interlock ring 106. At the same time that maintaining ring segments 136 and 464 engage contacts 138 and 324, segments 145 and 148 of reversing ring 146 engage contacts 147 and 150 respectively, and slightly later, segments 478 and 480 disengage these contacts. As segments 145 and 148 are connected, this operation results in the connection of contacts 147 and 150. A similar operation occurs as regards the corresponding segments and contacts for reversing ring 152.

During the above described operation of the rings, cam 448, acting through roller 444, causes counter-clockwise rotative movement of the operating lever 423 about shaft 426. The contour of cam 447 is such as to permit this movement. During the first part of this rotative movement, movable contacts 435 of auxiliary contacts 160 and 161 are caused to disengage their respective stationary contacts 433. Immediately thereafter, the movable contacts of the power contacts 156 and 157 and of auxiliary contacts 158 are caused to engage their respective stationary contacts. The contour of the cams is such that this engagement does not occur until after the engagement of segments 145 and 148 of reversing ring 146 and contacts 147 and 150. The purpose of this arrangement will be explained in connection with the description of the wiring diagram. The direction switch operating motor is brought to a stop by the compression of the contact springs 420 of the stationary contacts of the power contacts.

The potential switch operating motor, operating simultaneously with the direction switch operating motor, acts in a similar manner through cam 453 and lever 450 to cause the engagement of the potential switch power contacts 162 and 163 and auxiliary contacts 164 and 165.

The direction switch operating motor, during the above described rotative movement, causes the winding of chain 492 upon the pulley 491. This causes the lifting of weight 307 within its cylinder, the chain running over idler pulley 494 so that the portion of the chain below the pulley is maintained substantially vertical. The potential switch operating motor, during its rotative movement, acts in a similar manner to cause the lifting of weight 308 within its cylinder. Owing to the fact that there is a certain amount of friction between the segments of the rings operated by the direction switch motor and their cooperating contacts, the direction switch motor tends to operate more slowly than the potential switch motor. The potential switch motor is delayed, however, owing to the fact that the cylinder 508 is closed at the bottom and thus retards the upward movement of weight 308 sufficiently to insure that the power contacts of the direction and potential switches are caused to engage simultaneously. As will be explained in connection with the description of the wiring diagram (Figure 19), means are provided to prevent the slamming of the movable contacts of the potential and direction switches against their respective stationary contacts.

Further, owing to the fact that the potential switch operating motor does not operate rings, the friction of the various parts of the potential switch mechanism may not be sufficient to prevent the potential switch movable contacts from being bounced back off their respective stationary contacts. Means are provided to prevent this undesirable separation as will also be explained in connection with Figure 19.

Upon the deenergization of the direction and potential switch operating motors, they are returned to their off positions by the action of their respective weights 307 and 308. As a result of these return movements, direction switch power contacts 156 and 157 and auxiliary contacts 158 and potential switch power contacts 162 and 163 and auxiliary contacts 164 and 165 are caused to separate. Then direction switch auxiliary contacts 160 and 161 are caused to engage. This operation is positive, being effected by the action of cam 447 against roller 443. After the separation of the power contacts, segment 87 of interlock ring 88 moves back into engagement with contact 130, corresponding segment of interlock ring 106 moves back into engagement with its corresponding contact, segment 136 of maintaining ring 137 disengages contact 138, corresponding segment of maintaining ring 142 disengages its corresponding contact, segments 145 and 148 of reversing ring 146 disengage contacts 147 and 150 respectively, and the corresponding segments of reversing ring 152 disengage their corresponding contacts. The rotative movement of the direction switch operating motor past its off position is prevented by the friction between the ring segments and their contacts. The dash pot action of weight 308 in cylinder 508 prevents the rotative movement of the potential switch operating motor past its off position.

A similar operation takes place upon energization of these motors for down operation of the elevator car. The direction switch operating motor causes rotative movement of the direction switch cam shaft 445 in the counter-clockwise direction, as viewed in Figures 3, 5, 6, 7 and 8. During the first part of this movement, segments 136 and 464 of maintaining ring 137 engage contacts 324 and 138 respectively, and slightly later, segment 462 disengages contact 138 and segment 463 disengages contact 324. Thus segment 136 bridges feed contact 140 and contact 324. A similar operation occurs as regards the corresponding segments and contacts for maintaining ring 142. At the same time that segments 462 and 463 disengage contacts 138 and 324, segment 87 of interlock ring 88 disengages contact 92, thus breaking the circuit connection between feed contact 91 and contact 92.

A similar operation takes place as regards corresponding segment and contact for interlock ring 106. At the same time that maintaining ring segments 136 and 464 engage contacts 324 and 138, segments 326 and 327 of reversing ring 146 engage contacts 147 and 150 respectively, and slightly later, segments 478 and 480 disengage these contacts. A similar operation occurs as regards the corresponding segments and contacts for reversing ring 152. Owing to the fact that segments 326 and 327 are connected by straps 332 and 331 respectively to the corresponding segments of ring 152, this results in the connection of contacts 147 and 150 and the corresponding contacts for ring 152.

Owing to the contour of cams 447 and 448, this counter-clockwise rotative movement of the direction switch cam shaft causes the separation of auxiliary contacts 160 and 161 and the engagement of power contacts 156 and 157 and of auxiliary contacts 158. The potential switch motor, operating simultaneously with the direction switch motor, causes counter-clockwise rotative movement of its cam shaft to cause the engagement of power contacts 162 and 163 and auxiliary contacts 164 and 165. As before, the engagement of the power contacts of these switches does not occur until after the engagement of segments 326 and 327 of reversing ring 146 and contacts 147 and 150. Upon deenergization of these motors, the various parts are returned to off position by the action of weights 307 and 308 in a manner similar to that previously described.

As will be seen from later description, segments 462, 463 and 464 of ring 137, segment 477 of ring 88 and segments 478 and 480 of ring 146 and the corresponding segments of rings 106, 142 and 152 do not carry current. These segments are provided to support contacts 138, 324, 92, 130, 147 and 150 and the corresponding contacts for the other rings when not in engagement with the current carrying segments.

It is to be noted that direction switch cam 447 and potential switch cam 452, in addition to causing the positive operation of the direction switch and potential switch contacts upon deenergization of the motors, also serve to prevent the pushing of the levers 423 and 450 by hand to cause the engagement of the power contacts when the motors are in off position. Thus mechanical lockouts are provided for the direction and potential switches. Hand-wheels 510 and 511 may be provided, however, to cause the operation of these switches by hand in the event that such operation becomes desirable.

If desired, certain of the rings, for example, maintaining rings 137 and 142 and interlock rings 88 and 106, may be arranged to be operated by the potential switch motor. In this manner the friction to be overcome by each motor is more nearly equalized, particularly in view of the fact that the reversing rings are preferably made wider than the interlock and maintaining rings. With such arrangement, the cylinders for the return weights could be of the same construction.

Referring to the lower portion of the controller, the details of the various parts of the torque motor resistance switch Y, the running switch R, the fast speed return switch FR, the neutral switch N, the slow speed switch S, the slow speed return switch SR and the fast speed switch F will be described. These switches are illustrated in their positions for neutral position of the torque motor rotor.

The torque motor resistance switch Y is employed to control the operation of the torque motor, as will be described later. This switch is provided with two pairs of contacts, 250 and 258. The stationary contacts of each pair of contacts, as illustrated by stationary auxiliary contact 512 of contacts 250 in Figure 9, is of the same construction and arrangement as that of stationary contact 433 of direction switch auxiliary contacts 160, previously described. The movable contact of each pair of contacts is of the same construction as that of movable contact 435 of direction switch auxiliary contacts 160, as illustrated by movable contact 513 of contacts 250. These movable contacts are carried by the laterally extending projections formed on the depending arm of lever 514. This lever is pivotally mounted on shaft 515. This shaft is supported by brackets 516, 517, 518 and 520, being positioned by set screws 521. The upper arm of lever 515 is formed with a projection to which a shaft for pivotally supporting roller 522 is pinned. The lever is operated by a cam 519 mounted on shaft 263, being positioned thereon, as by a pin. The roller is maintained in engagement with the cam by spring 523 extending between the upper end of the lever and a spring seat mounted on the panel. Shaft 263 is supported by bearings provided in brackets 516, 517, 518 and 520.

The running switch R is employed to connect the elevator motor fast speed stator winding to the mains after the voltage applied thereto has been raised to a predetermined value by the action of the induction regulator. The construction of this switch may be seen upon reference to Figures 2 and 10. This switch is provided with three pairs of contacts 270, 271 and 272. The construction and arrangement of these contacts is the same as that of the direction switch power contacts. Owing to the fact that there are three pairs of contacts, the operating lever 524 for these contacts is provided with three upwardly extending arms. This lever is provided with a forked arm 525 for rotatably supporting roller 526. Another roller 527 is rotatably secured to the middle upwardly extending arm of the lever. The lever is operated by cams mounted on shaft 263, cam 528 being positioned on the shaft to cooperate with roller 526 and cam 530 to cooperate with roller 527.

The fast speed return switch FR is employed to control the returning of the torque motor rotor to neutral position under certain conditions of operation. This switch is provided with two pairs of contacts 264 and 265. The construction and arrangement of these contacts, their operating lever 531, spring 532 and roller 533 is the same as that described for switch Y. As shown in Figure 11, lever 531 is pivotally mounted on shaft 515. The contour of the operating cam 534, however, is somewhat different from that of cam 519 for switch Y. This cam is positioned, as by a pin, on shaft 263.

The neutral switch N is employed to prevent the application of voltage above a certain value to the elevator motor stator windings at starting. Only one pair of contacts, designated 113, are provided for this switch. The construction and arrangement of these contacts is the same as that described for direction switch auxiliary contacts 160, the movable contact being carried by the lower end of operating lever 535. This lever is pivotally mounted on shaft 515 and is provided with an operating roller 536 and a spring 537 for maintaining the roller in engagement with the operating cam 538, as shown in Figure 12. This cam is positioned by a pin on shaft 263.

The slow speed switch S is employed for controlling the circuit connections for the slow speed stator winding of the elevator motor. The construction and arrangement of this switch may be seen upon reference to Figures 2 and 13. This switch is provided with two pairs of top contacts 291 and 292 and three pairs of bottom contacts 206, 222 and 234. The construction and arrangement of the top contacts is the same as that of the direction switch power contacts, previously described. The operating lever 540, as in the case of the direction switch lever 423, is provided with two upwardly extending arms which carry the movable contacts of the top contacts. The lever 540 is also provided with three depending arms which carry the movable contacts of the bottom contacts 206, 222 and 234. The construction and arrangement of these bottom contacts is substantially the same as that of the top contacts and, therefore, will not be described. The lever 540 is also provided with a forked arm 541 for rotatably supporting roller 542. Another roller 543 is rotatably supported by one of the upwardly extending arms of the lever. This lever is operated by cams 544 and 545 mounted on shaft 263. Cam 544 is positioned on the shaft for cooperation with roller 542 and cam 545 is positioned on the shaft for cooperation with roller 543.

The slow speed return switch SR is employed to effect the return of the torque motor rotor from a slow speed position to neutral during the stopping of the elevator motor. The construction of this switch may be seen upon reference to Figures 2 and 14. The switch is provided with two pairs of contacts 305 and 306. The construction and arrangement of these contacts, the operating lever 546, roller 547 and spring 548 is the same as that described for the torque motor resistance switch Y. The lever is pivotally mounted on shaft 515. The contour of the operating cam 550, however, is different. This cam is positioned on shaft 263, as by a pin.

The fast speed switch F is employed to control the circuits for the fast speed stator winding of the elevator motor. This switch is provided with two pairs of top contacts 217 and 245 and three pairs of bottom contacts 287, 288 and 289. As will be seen upon consideration of Figures 2 and 15, the construction and arrangement of these contacts is the same as that of the contacts of the slow speed switch S, the movable contacts of the pairs being carried by the lever 551. This lever is provided with a forked arm 552 for rotatably supporting roller 553. Another roller 554 is rotatably supported by one of the upwardly extending arms of the lever. The lever is pivotally mounted on shaft 515 and is operated by cams 555 and 556 mounted on shaft 263. Cam 555 is positioned on the shaft for cooperation with roller 553 and cam 556 is positioned on the shaft for cooperation with roller 554.

A sprocket wheel 557 is mounted on shaft 263 to the right of bracket 520, as viewed in Figure 2. A sprocket chain 262 connects this sprocket wheel with sprocket wheel 558, mounted on the end of the shaft 560 of the torque motor. The torque motor, designated as a whole by the numeral 50, upon being energized, acts through the sprocket wheels and chain to cause the rotative movement of the cam shaft 263. At the same time, it causes rotative movement of the rotor of the induction regulator with respect to the stator. The induction regulator is designated as a whole by the numeral 40. The rotors (not shown) of both the induction regulator and the torque motor are mounted on the same shaft 560. The frame of the induction regulator is designated by the numeral 561 while the frame of the torque motor is designated by the numeral 562.

Feet are provided on these frames through which bolts 563 extend to secure the motor and regulator to the bed plate 412. The frames are connected by an intermediate winding guard 564 and are also provided with end winding guards 565 and 566. The shaft 560 is supported beyond the winding guards by bearings provided in the pedestals 567 and 568. These pedestals are mounted on pads on the bed plate and are secured thereto as by bolts 570.

The rotor of the induction regulator is of the wound type. The collector rings 190, 194 and 197 for the induction regulator rotor phase windings are mounted on an insulating bushing 571 keyed on shaft 560 between pedestal 567 and the rotor. Insulating discs 572 are provided between the collector rings. Studs (not shown) are provided for clamping the collector rings and discs together and for connecting the rings to the phase windings of the rotor.

Pedestal 567, as shown in Figure 3, is provided with two projections 573 and 574. The mounting stems 575 for the brush holders are secured to these projections as by nuts 576. The brush holders are mounted on insulating bushings 577, provided on the stems, being separated by the insulating collars 578. As illustrated for brush holder 580 in Figure 3, each holder extends between the two mounting stems and is provided with two apertures for slidably receiving the brushes 581 and 582. Each brush is pressed into engagement with its collector ring by a spring 583. The brushes are connected by flexible conductors 584 to the brush holders. A terminal screw 586 is provided for connecting the brush holder in the system.

To the left of pedestal 567 (as viewed in Figure 2), shaft 560 is provided with a crank arm 590. An adjustable connecting rod 591 extends from this crank arm to the piston 592 of a dash pot. The piston is arranged in the dash pot cylinder 593. This cylinder is provided with an aperture 594 (Figure 4) near its bottom end. It is also provided with another aperture below aperture 594. This lower aperture is threaded to receive an apertured plug 595. This arrangement is provided for adjusting purposes as plugs having different sized apertures may be employed, depending upon operation requirements. The aperture in the plug, however, will be smaller than aperture 594, as it is employed to restrict the flow of air out of the cylinder upon downward movement of the piston after aperture 594 has been covered. The cylinder is formed with projections 596 through which bolts 597 extend to secure the cylinder to the bed plate. The dash pot is provided with a cover 599.

Figure 16:
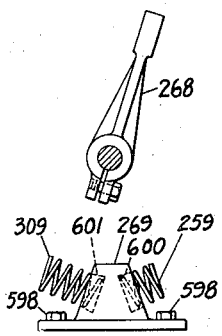
Figure 16 is a detail of the stop arm and bumper, taken along line 16—16 of Figure 2.

A stop arm 268 is clamped to the shaft 560 at the other end thereof between pedestal 568 and sprocket wheel 558. This stop arm is adapted to engage the bumper springs 259 and 309 secured to bumper support 269. The support 269 is secured to the bed plate as by bolts 598. This construction is shown in side elevation in Figure 16. The bumper support 269 is provided with two recesses 600 and 601. Spring 259 is arranged in recess 600 and secured therein by a filling of metal, while spring 309 is arranged in recess 601 and secured therein by a filling of metal.

As will be seen from later description, the torque motor may be energized for two directions of rotation. As viewed in Figure 3, clockwise rotative movement from neutral is for elevator motor fast speed operation and will be known as the fast speed direction. Counter-clockwise rotative movement from neutral is for elevator motor slow speed operation and will be known as the slow speed direction. Thus the rotative movement of the cams in Figures 9, 10, 11, 12, 13, 14 and 15 is clockwise in the fast speed direction and counter-clockwise in the slow speed direction. Assume that the torque motor is energized for rotative movement in the fast speed direction. The torque motor, therefore, driving through sprocket wheel 558, chain 262 and sprocket wheel 557, causes rotative movement of the cam shaft 263. In order to explain the sequence of operation of the switches, the degrees of angular movement from neutral at which certain operations take place will be given. The cams are so designed as to give this operation and the sequence of operation obtained has been found suitable in actual practice. It is to be understood, however, that cams of different contour than those shown and different settings of cams as well as a different neutral position may be employed if desired. Assume the neutral position of the torque motor rotor as the zero point (0 degrees).

During the first ten degrees of movement of shaft 263 in the fast speed direction, cam 556, acting against roller 554, causes sufficient rotative movement of the fast speed switch operating lever about shaft 515 to cause the top contacts 217 and 245 of the fast speed switch to move to their final engaged position. As the torque motor rotor continues its rotative movement, the fast speed return switch cam 534 permits spring 532 to cause the clockwise movement of lever 531. As a result, upon thirty degrees of movement of the torque motor rotor from neutral, the fast speed return switch contacts 264 and 265 are caused to engage. At the same time, the neutral switch cam 538 starts to move lever 535 in a counter-clockwise direction. By the time that the torque motor rotor has moved fifty degrees, the separation of the neutral switch contacts 113 is effected and the fast speed return switch contacts are moved into their final engaged position. At the same time, running switch cam 530 starts to move lever 524 in a counter-clockwise direction. As the torque motor rotor continues its rotative movement, a point is reached where torque motor resistance switch cam 519 starts to cause counter-clockwise rotative movement of lever 514 about shaft 515 against the force of spring 523. Upon the torque motor rotor having moved eighty degrees from neutral, the separation of the torque motor resistance switch contacts 250 and 258 is effected. By the time that the torque motor rotor has moved ninety-five degrees from neutral, running switch cam 530 has caused sufficient movement of lever 524 to effect the engagement of the running switch contacts 270, 271 and 272. Movement of the torque motor rotor one hundred and twenty degrees from neutral results in the movement of the running switch contacts into their final engaged position. Upon further movement of the torque motor rotor, stop arm 268 engages bumper spring 259 and causes its full compression to bring the torque motor rotor to a stop. The spring acts, as it is being compressed, to damp the rotative movement before the final stop is effected, the action of the spring being assisted by electrical means, as will be explained later.

The above described rotative movement of the torque motor rotor results in the rotative movement of the induction regulator rotor with respect to the stator. As will be explained later, this results in a gradual increase in value of the voltage applied to the elevator motor fast speed stator winding. The engagement of the running switch contacts to connect the elevator motor stator winding directly to the mains occurs at the time that the applied voltage has been increased to a value substantially equal to that of the line.

The above described rotative movement of the torque motor rotor also results in the rotative movement of the dash pot crank arm 590 to effect the upward movement of the dash pot piston 592 within the dash pot cylinder 593. The dash pot acts to prevent this rotative movement occurring too rapidly.

As will be described in connection with the description of the wiring diagram, (Figure 19), upon initiating the stopping operation for the elevator car, the torque motor is energized to effect the reverse rotative movement of its rotor from fast speed position through neutral into slow speed position. Upon movement from fast speed position to neutral, a reverse operation of the switches and regulator is obtained. Briefly, first the running switch contacts 270, 271 and 272 are separated by the action of cam 528, permitting the regulator to again assume control, then the torque motor resistance switch contacts 250 and 258 are caused to engage by the action of spring 523, then the neutral switch contacts 113 are caused to engage by the action of spring 537 and then the fast speed return switch contacts 264 and 265 are separated by the action of cam 534.

The action of the cams and levers during the rotative movement from neutral to the slow speed position is similar to that described for movement from neutral to the fast speed position so that the various operations which take place during this rotative movement will be more briefly described. Upon the torque motor rotor moving fifteen degrees from neutral in the slow speed direction, fast speed switch cam 555, acting through roller 553, causes the separation of the top contacts 217 and 245 of the fast speed switch. Upon thirty degrees of movement, slow speed switch cam 545, acting through roller 543, causes the separation of bottom contacts 206, 222 and 234 of the slow speed switch. Also slow speed return switch cam 550 permits spring 548 to cause the engagement of slow speed return switch contacts 305 and 306. Upon the torque motor rotor having moved forty degrees from neutral, fast speed switch cam 555, acting through roller 553, causes the engagement of fast speed switch bottom contacts 287, 288 and 289. Upon fifty degrees of movement, neutral switch cam 538, acting through roller 536, causes the separation of neutral switch contacts 113. Upon fifty five degrees of movement, slow speed switch cam 545, acting through roller 543, causes the engagement of top contacts 291 and 292 of the slow speed switch.

As will be explained later, means are provided for causing the rapid rotative movement of the torque motor rotor from fast speed position to neutral. Furthermore, the dash pot piston acts to aid in effecting this return movement. The torque motor rotor and the rotating parts of the associated apparatus, therefore, will develop considerable momentum as this rotative movement progresses. Just before neutral position is reached, however, the dash pot piston reaches a position to cover aperture 594. The flow of air out of the cylinder from below the piston is thus restricted to the small aperture in plug 595. The downward movement of the dash pot piston, therefore, is considerably retarded, resulting in a reduction in the speed of rotative movement and therefore a reduction of momentum of the torque motor rotor and rotating parts of its associated apparatus. This retarding action is only momentary, however, as the dash pot piston quickly reaches its lowermost position and starts again upon its upward movement as the torque motor rotor moves from neutral position in the slow speed direction. Thus the change of connections from the elevator motor fast speed winding to the slow speed winding, which is effected by the above described operation of the fast and slow speed switches, as will be explained later, occurs very quickly.

Upon continued rotative movement of the torque motor rotor in the slow speed direction to a point one hundred and fifty degrees from neutral, torque motor resistance switch cam 519 again causes the separation of the torque motor resistance switch contacts 250 and 258. On further movement of the torque motor rotor, stop arm 268 engages bumper spring 309 and causes its full compression to bring the torque motor rotor to a stop. Spring 309, as in the case of spring 259, acts to damp rotative movement before the final stop is effected, the action of the spring being assisted by electrical means, as before. Owing to the fact that the momentum of the moving parts for the operation of moving the cam shaft 263 from fast speed position to slow speed position, is greater than the momentum of the moving parts for movement from neutral into the fast speed position, spring 309 is made longer than spring 259 to start damping action at an earlier point.

The above described rotative movement of the torque motor rotor results in the rotative movement of the induction regulator rotor with respect to the stator in the opposite direction from that described for moving from neutral to fast speed position. As will be explained later, this results in a gradual decrease in the value of the voltage applied to the elevator motor fast speed stator winding and later, when the fast speed stator winding is disconnected and the slow speed stator winding is connected for operation, in a gradual increase in the value of the voltage applied to the slow speed stator winding. This causes the elevator motor to slow down, as will be explained later.

Also, the rotative movement of the torque motor rotor from neutral in the slow speed direction results in the continued rotative movement of the dash pot crank arm 590 to effect the upward movement of dash pot piston 592 within the dash pot cylinder. Thus the dash pot acts to prevent too rapid rotative movement from neutral in the slow speed direction.

Upon the speed of the elevator car being decreased to a certain value during the stopping operation, the circuits for the elevator motor slow speed winding are broken and the torque motor is energized to return to neutral position. The manner in which this operation is effected will be described later. During this return movement, first torque motor resistance switch contacts 250 and 258 are caused to engage by the action of spring 523, then the top contacts 291 and 292 of the slow speed switch are separated by the action of cam 544, then the neutral switch contacts 113 are caused to engage by the action of spring 537, then the fast speed switch bottom contacts 287, 288 and 289 are separated by the action of cam 556, and then the bottom contacts 206, 222 and 234 of the slow speed switch are caused to engage by the action of cam 544. At the same time that the slow speed switch bottom contacts are caused to engage, the slow speed return switch contacts 305 and 306 are separated by the action of spring 548. As will be explained later, this results in the deenergization of the torque motor stator winding. The torque motor rotor and the rotating parts of its associated apparatus, however, have sufficient momentum to move on to neutral position where they are brought to rest by the retarding action of the dash pot, due to the covering of aperture 594 by the dash pot piston. Just before neutral position is reached, the top contacts 217 and 245 of the fast speed switch are caused to reengage by the action of cam 556.

Direction switch power contacts 156 and 157, potential switch power contacts 162 and 163, fast speed switch top contacts 217 and 245, slow speed switch top contacts 291 and 292 and running switch contacts 270, 271 and 272 are provided with blow-outs. As the construction and arrangement of these blow-outs are practically the same, only one of them, namely, blow-out 610 for direction switch contacts 156, will be described. Referring to Figures 2 and 3, the blow-out coil for blow-out 610 is designated 185. This coil is mounted on an insulating bushing (not shown) provided on blow-out rod 611. This blow-out rod is supported by brackets 612, secured to the panel section, being retained in position, as by pins. The blow-out coil is positioned between the deflector plates 613. These plates are maintained separated as by an asbestos wood spacer 614. The blow-out horns 615 are positioned on the outside of the deflector plates.

It is to be noted that the blow-out rod 611 serves for the blow-outs for both power contacts of the direction switch. The same construction is employed in the case of the potential switch power contacts and the top contacts of the fast and slow speed switches. In the case of running switch contacts the blow-out rod serves for all three blow-outs. For convenience of describing the wiring diagram (Figure 19), the blow-out coils for each pair of contacts is given a different numeral. The blow-out coils for contacts 157, 162, 163, 217, 245, 291, 292, 270, 271 and 272 are designated respectively as 183, 186, 181, 205, 233, 293, 302, 273, 274 and 275.

It is preferred to provide deflector plates 616 between the slow speed switch bottom contacts 206, 222 and 234 and also between the fast speed switch bottom contacts 287, 288 and 289.

An electromagnetic switch is mounted on panel section 402 above cam shaft 263. This switch is for controlling the direction of rotative movement of the torque motor rotor and therefore is termed the torque motor reversing switch. It will be designated as a whole by the character X. The construction and arrangement of this switch may be seen upon reference to Figures 2 and 3. The switch is provided with two stationary forward contacts 173 and 176 and two stationary back contacts 172 and 175. The stationary forward contacts are supported by lateral projections formed on bracket 620. The stationary back contacts are similarly supported by lateral projections formed on an extension of the bracket. The bracket is secured to panel section 402 as by a screw (not shown). These stationary contacts are of substantially the same construction as the movable contacts of direction switch auxiliary contacts 158 and 160, being provided with insulating bushings. The stationary forward contacts, as in the case of the movable contact of contacts 158, extends outwardly from the panel, while the stationary back contacts, as in the case of the movable contact of contacts 160, extends inwardly toward the panel. The bracket also supports an arc deflector plate 619.

The movable contacts 171 and 174 for cooperating with these stationary contacts are carried by the operating lever 621, the contact holders 622 for each of these contacts being secured to an insulating block mounted on the upper end of the lever. The lever is pivoted on a shaft supported by projections formed on the end lamination plates of the magnet frame 623. A weight 624 is adjustably mounted on a screw 625 secured to lever 621. This weight tends to maintain the lever in its outward position, as shown, with the movable contacts 171 and 174 in engagement with stationary back contacts 172 and 175 respectively. An adjustable abutment screw 626 is carried by the arm 627 formed on lever 621. This screw engages a stop extending between the frame end plates to limit the outward movement of the lever. The operating coil 168 for this switch is mounted on the core of the magnet frame. It is provided with a secondary coil 628. The armature 630 of the switch is pivotally carried by the lever 621.

Upon energization of coil 168, the armature is attracted, causing the pivotal movement of lever 621 to effect the disengagement of movable contacts 171 and 174 and their respective stationary back contacts 172 and 175 and the engagement of these movable contacts with their respective stationary forward contacts 173 and 176. Upon the deenergization of the operating coil, weight 624 causes the pivotal movement of the lever to effect the separation of movable contacts 171 and 174 and their respective stationary forward contacts 173 and 176 and the reengagement of these movable contacts with their respective stationary back contacts 172 and 175.

Figure 18:
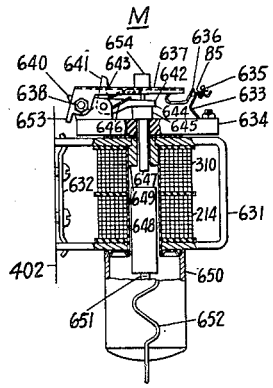
Figure 18 is a side view of the same, with parts broken away.
Figure 17:
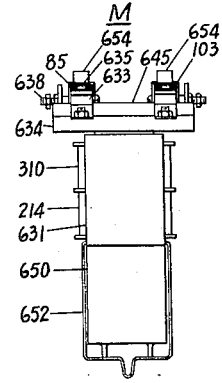
Figure 17 is an enlarged view, in front elevation, of a protective relay.

In addition to the torque motor reversing switch, two relays are mounted on panel section 402, one on each side of the switch. These relays are for protective purposes and are termed protective relays. One of these relays will be designated by the character M while the other will be designated by the character O. As the construction and arrangement of these relays is identical, only one of them, relay M, shown in Figures 17 and 18, will be described. The relay is provided with two operating coils, a main coil 214 and an auxiliary coil 310. These coils are wound on an insulating cylinder and are separated by an insulating disc. These coils are mounted in a frame 631 secured to the panel by the retaining plate 632. The relay is provided with two pairs of contacts 85 and 103. The stationary contact 633 of contacts 85 is secured to an insulating plate 634, mounted on the top of the frame 631. A terminal screw 635 is provided for connecting the stationary contact in the system. The movable contact 636 of contacts 85 is carried by the contact lever 637. This lever is pivotally mounted, as by a screw 638, on a bracket 640 secured to the plate 634. The pivot screw is extended and provided with binding nuts to form a terminal for the movable contact. A slot is formed in lever 637 through which the latch arm 641 of the trip lever 642 extends. The trip lever is also pivotally mounted on bracket 640. The latch arm 641 is formed with a catch 643 which engages the edge of the slot in lever 637 to maintain the contacts in engagement. The other arm 644 of the trip lever rests upon a trip plate 645. A spring 646 is wound around the pivot pin for the trip lever and is formed with extensions engaging arm 644 and contact lever 637 in such manner as to tend to effect the counter-clockwise movement of the contact lever about its pivot.

Contacts 103 are arranged in a similar manner and will not be described. The trip plate 645 serves for the trip levers for both movable contacts. It is secured to a plunger 647, extending through the insulating plate into the insulating cylinder upon which the coils are wound. A guide 649 is provided for the plunger within the cylinder. The core 648 for the coils is movable within the insulating cylinder, the bottom of the plunger guide 649 forming a stop for the core to limit its upward movement. The core is adjustably secured to the piston (not shown) of the dash pot 650, as by a screw 651. The dash pot is provided for timing the operation of the relay. The dash pot cylinder is secured to frame 631 by the spring 652.

Normally the contacts of the relay are in engagement, as illustrated. Upon sufficient energization of either the main or auxiliary coil for a predetermined time interval, determined by the adjustment of the dash pot, the core 648 is caused to engage the plunger 647, moving it upwardly within its guide. The plunger 647, as a result of this upward movement, acts through trip plate 645 to cause the counter-clockwise movement of the trip levers about their pivots. As a result, the catch formed on each trip lever latch arm disengages the edge of its respective contact lever slot and the springs 646 cause the counter-clockwise movement of the contact levers to effect the separation of the contacts. Each contact lever is formed with a projection 653 which engages the insulating plate to limit the movement of the lever. As will be seen from later description, the coils of the relay are deenergized as a result of the separation of the contacts so that the core, plunger and trip plate are permitted to return to their former positions. The contacts are maintained separated, however, by the springs. Each contact lever is provided with a reset button 654. The relay may be reset manually by pushing down on these buttons against the force of springs 646 until the catches on the latch arms engage the edges of their respective slots to latch the contacts in engagement.

Figure 19:
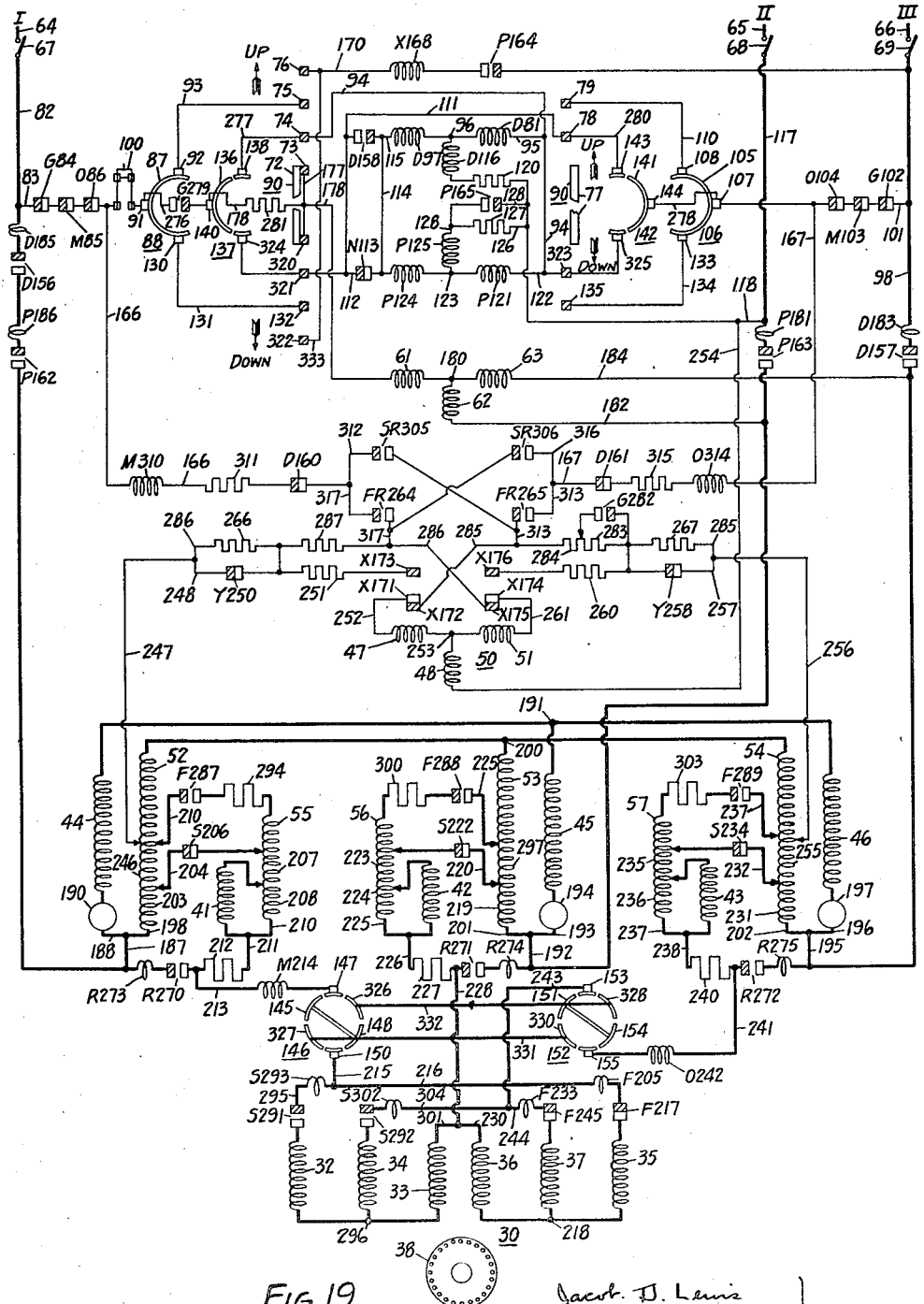
Figure 19 is a simplified wiring diagram of the control and power circuits.

Referring again to Figures 3 and 4, a plurality of control resistances are mounted at the rear of the controller frame. These resistances are designated as a whole by the numeral 660. For convenience of description, however, each of these resistances will be designated by a different numeral in describing the wiring diagram (Figure 19). These resistances are mounted on straps 661 and 662 secured to the rear uprights of the frame sections. These straps also aid in securing rigidity of construction of the controller frame.

A plurality of grid resistances 663 are mounted below resistances 660 on the threaded rods 664 and 665. These resistances are separated by washers 666. As some of these washers are of insulating material while the others are of conducting material, certain of the resistances are electrically connected so as to form resistance units. As in the case of the control resistances, each of these resistance units will be designated by a different numeral in describing the wiring diagram. Nuts 667 are provided on rods 664 and 665. The risistances are pressed together and against these nuts by the compression springs 668. The compression of these springs is adjusted by the nuts 669. The rods are secured to the rear uprights of the frame sections by nuts 670. These rods also aid in securing rigidity of construction.

The main transformer 60 and auxiliary transformer 70 also are mounted at the rear of the frame. The transformers are supported by angle bars 671 mounted on the brackets 672, the brackets being secured to the rear uprights of the frame sections as illustrated. Studs 673 extend through the angle bars and transformer cores and are provided with nuts for securing the bars and cores together. To secure rigidity of construction, additional angle bars 674 are secured to each transformer core at the top thereof by studs and nuts. These angle bars are connected to the lower angle bars 671 by tie rods 675 and nuts 676. The angle bars 671 and brackets 672 also aid in securing rigidity of construction of the controller frame.

Reference may now be had to Figure 19 which illustrates diagrammatically the various control and power circuits. No attempt is made in this figure to show the contacts and windings of the electromagnetic devices for operating these contacts in their associated positions, a "straight" diagram being employed in which various parts, such as the operating cams and levers and the rotors of the operating motors, are omitted and in which the contacts and windings of the electromagnetic operating devices are separated in such manner as to render the circuits involved relatively simple. Also, the parts of other apparatus are illustrated in a manner tending to simplify the diagram. For a clearer understanding of the invention, the stationary contacts of the switches are illustrated in cross section.

Throughout the description which follows, the same designating letters are employed for the switches as have been employed in describing Figures 1, 2, 5, 9, 10, 11, 12, 13, 14 and 15. The designation of these switches may be summarized as follows:

P—Potential switch,
D—Direction switch,
S—Slow speed switch,
F—Fast speed switch,
R—Running switch,
X—Torque motor reversing switch,
Y—Torque motor resistance switch,
N—Neutral switch,
G—Governor switch,
M—Protective relay,
O—Protective relay,
SR—Slow speed return switch,
FR—Fast speed return switch.

In addition, the usual reference numerals, some of which have already been employed in connection with the preceding description, will be appended to these letters to designate the different parts of the above enumerated switches. For example, contacts D 156 are contacts of the direction switch, while phase winding P 121 indicates one phase of the stator winding of the motor which operates the potential switch.

The elevator motor 30, as previously set forth, is illustrated as having two separate primary or stator windings, one for producing a low number of stator poles, and therefore for causing the motor to run at fast speed, and the other for producing a high number of poles, and therefore for causing the motor to run at slow speed. The phase windings of the slow speed stator winding are designated 32, 33 and 34 while the phase windings of the fast speed stator winding are designated 35, 36 and 37. The secondary or rotor winding of the elevator motor is illustrated as of the squirrel cage type and is designated 38. In the case of the induction regulator, the stator winding is the secondary winding while the rotor winding is the primary winding. The stator phase windings of the induction regulator are designated 41, 42 and 43, the rotor phase windings of the regulator being designated 44, 45 and 46. 47, 48 and 51 are the primary or stator phase windings of the torque motor 50 which imparts rotative movement to the regulator rotor, the rotor of the torque motor not being shown. The phase windings of the main transformer 60 are designated 52, 53 and 54, while the phase windings of the auxiliary transformer 70 are designated 55, 56 and 57. 61, 62 and 63 are the stator phase windings of the brake operating motor 80. The alternating current supply mains are designated 64, 65 and 66, the phases being indicated by the Roman numerals I, II and III. 67, 68 and 69 are the blades of the triple pole knife switch for connecting the system to the supply mains. In order to suit the type of diagram employed, the blades of this switch are shown separated. The various safety, limit, stop and emergency switches and door and gate contacts are omitted in order to simplify the description. The various parts of the apparatus are illustrated in the positions which they assume with the car switch 90 in off position and with the rotor of the torque motor 50 in neutral position.

Assume that the elevator car is at rest at the first floor landing and that it is desired to start the car in the up direction. The operator moves the car switch into position where its contact segment 72 bridges contacts 73, 74, 75 and 76 and its contact segment 77 bridges contacts 78 and 79. Upon the engagement of segment 72 with contact 75 and segment 77 with contact 79 (75 and 79 being the up feed contacts), circuits are completed for the stator windings of the direction switch and potential switch operating motors for up operation.

The circuit for phase winding D 81 of the stator of the direction switch operating motor may be traced from switch blade 67 (phase I), line 82, by way of line 83 through contacts G 84 of the governor switch, contacts M 85 and O 86 of the protective relays M and O and safety switch 100 (in the car), by way of segment 87 of interlock ring 88, bridging contacts 91 and 92, line 93, by way of car switch segment 72, bridging contacts 75 and 74, line 94, by way of line 95 through phase winding D 81, to the star point 96 of the direction switch operating motor stator winding. The circuit for phase winding D 97 of the stator of the direction switch operating motor may be traced from switch blade 69 (phase III), line 98, by way of line 101 through contacts G 102 of the governor switch and contacts M 103 and O 104 of the protective relays M and O, by way of segment 105 of interlock ring 106, bridging contacts 107 and 108, line 110, by way of car switch segment 77, bridging contacts 79 and 78, line 111, by way of line 112 through contacts N 113 of the neutral switch, line 114, by way of line 115 through phase winding D 97, to star point 96. The circuit for the remaining phase winding D 116 of the direction switch operating motor may be traced from switch blade 68 (phase II), line 117, by way of line 118 through resistance 120 and phase winding D 116, to star point 96.

The circuit for phase winding P 121 of the stator of the potential switch operating motor from switch blade 67 (phase I) is the same as that above traced for phase winding D 81 of the stator of the direction switch operating motor up to the point where line 95 branches off line 94. Line 94, however, continues past this point to line 122, the circuit for winding P 121 then extending by way of line 122 through the winding, to the star point 123 of the potential switch operating motor stator winding. Similarly the circuit for phase winding P 124 of the stator of the potential switch operating motor from switch blade 69 (phase III) is the same as that above traced for phase winding D 97 of the stator of the direction switch operating motor up to the point where line 114 branches off line 112. From this point the circuit for winding P 124 continues on by way of line 112 through the winding, to star point 123. The circuit for phase winding P 125 of the stator of the potential switch operating motor corresponds for the main part to the circuit for phase winding D 116 of the stator of the direction switch operating motor and may be traced from switch blade 68 (phase II), line 117, line 118, by way of line 126, branching off line 118, through resistance 127, by way of line 128 through phase winding P 125, to star point 123.

The direction switch operating motor, having its stator winding energized, moves into its up operative position. During this movement, segment 87 of the interlock ring 88 moves off contact 130, breaking the circuit by way of line 131 to car switch down feed contact 132, and segment 105 of the interlock ring 106 moves off contact 133, breaking the circuit by way of line 134 to car switch down feed contact 135. At the same time, segment 136 of the maintaining ring 137 moves into engagement with contact 138, thus connecting this contact with contact 140, and segment 141 of maintaining ring 142 moves into engagement with contact 143, thus connecting this contact with contact 144. Also at the same time, segment 145 of reversing ring 146 engages contact 147 and segment 148, connected to segment 145, engages contact 150, thus connecting contacts 147 and 150, and segment 151 of reversing ring 152 engages contact 153 and segment 154, connected to segment 151, engages contact 155, thus connecting contacts 153 and 155. Immediately thereafter, the direction switch operating motor, as a result of its continued rotative movement, causes the engagement of direction switch power contacts D 156 and D 157 and auxiliary contacts D 158. The separation of direction switch auxiliary contacts D 160 and D 161 also occurs during the movement of the direction switch motor into operative position. As previously explained, this separation occurs prior to the engagement of contacts D 156, D 157 and D 158.

The potential switch operating motor, also having its stator winding energized, moves into its operative position, causing the engagement of potential switch power contacts P 162 and P 163 and auxiliary contacts P 164 and P 165. As previously explained, this occurs simultaneously with the engagement of direction switch contacts D 156, D 157 and D 158.

As previously set forth in describing Figures 3 and 4, means are provided for limiting the voltage applied to the stator windings of the direction switch and potential switch operating motors and therefore the torque exerted by these motors so as to prevent the slamming of the movable contacts of these switches against their respective stationary contacts as their engagement occurs. Resistances 120 and 127 are employed for this purpose, resistance 120 serving to limit the flow of current to the stator winding of the direction switch operating motor, and resistance 127 serving to limit the flow of current to the stator winding of the potential switch operating motor. It was also explained that, owing to the fact that the potential switch operating motor does not operate rings, the friction of the various parts of the potential switch mechanism may not be sufficient to prevent the potential switch movable contacts from being bounced back off their respective stationary contacts by the action of the contact springs. This undesirable separation of the contacts is prevented, however, by the short circuiting of resistance 127 by contacts P 165. The short circuiting of this resistance results in increasing the amount of current supplied to the stator winding of the potential switch operating motor and thus in increasing the torque exerted by this motor, causing the potential switch contacts to be maintained in engagement.

The purpose of contacts D 160 and D 161 of the direction switch will be seen from later description. It might be noted at this time, however, that contacts D 160 are arranged in line 166 and that contacts D 161 are arranged in line 167 so that, so long as these contacts are separated, the torque motor cannot be operated by the engagement of the contacts of the fast and slow speed return switches FR and SR. Direction switch contacts D 158, upon their engagement, by-pass contacts N 113 of the neutral switch. The object of this arrangement will be explained later. The remaining auxiliary contacts, namely, contacts P 164 of the potential switch, complete the circuit for the torque motor reversing switch actuating coil X 168. This circuit may be traced from switch blade 67 (phase I), line 82, by way of line 83, through contacts G 84, contacts M 85, contacts O 86 and safety switch 100, by way of interlock ring segment 87, bridging contacts 91 and 92, line 93, by way of car switch segment 72, bridging contacts 75 and 76, by way of line 170 through coil X 168 and contacts P 164, line 98, to switch blade 69 (phase III). The torque motor reversing switch, upon operation, causes movable contact X 171 to disengage stationary back contact X 172 and to engage stationary forward contact X 173 and causes movable contact X 174 to disengage stationary back contact X 175 and to engage stationary forward contact X 176.

The engagement of the power contacts of the direction and potential switches completes the circuits for the fast speed stator winding of the elevator motor, the rotor winding of the induction regulator and the stator winding of the brake operating motor. The circuit for phase winding 61 of the stator of the brake operating motor may be traced from switch blade 67 (phase I), line 82, by way of line 83 through contacts G 84, contacts M 85, contacts O 86 and safety switch 100, by way of interlock ring segment 87, bridging contacts 91 and 92, line 93, by way of car switch segment 72, bridging contacts 75 and 73, line 177, by way of line 178 through phase winding 61, to the star point 180 of the brake operating motor stator winding. The circuit for phase winding 62 of the stator of the brake operating motor may be traced from switch blade 68 (phase II), by way of line 117 through blow-out coil P 181 and contacts P 163 of the potential switch, by way of line 182 through phase winding 62, to star point 180. The circuit for the remaining phase winding 63 of the stator of the brake operating motor may be traced from switch blade 69 (phase III), by way of line 98 through blow-out coil D 183 and contacts D 157 of the direction switch, by way of line 184 through phase winding 63, to star point 180.

The circuit for phase winding 44 of the rotor of the induction regulator may be traced from switch blade 67 (phase I), by way of line 82 through blow-out coil D 185 and contacts D 156 of the direction switch and blow-out coil P 186 and contacts P 162 of the potential switch, line 187, by way of line 188 through collector ring 190 and phase winding 44, to the star point 191 of the rotor of the induction regulator. The circuit for phase winding 45 of the rotor of the induction regulator may be traced from switch blade 68 (phase II) by way of line 117 through blow-out coil P 181 and contacts P 163, line 192, by way of line 193 through collector ring 194 and phase winding 45, to star point 191. The circuit for the remaining phase winding 46 of the rotor of the induction regulator may be traced from switch blade 69 (phase III), by way of line 98 through blow-out coil D 183 and contacts D 157, line 195, by way of line 196 through collector ring 197 and phase winding 46, to star point 191.

As the circuits for the fast speed stator winding of the elevator motor involve the main transformer, the circuits for the winding of this transformer will first be traced. The circuit for phase winding 52 of the main transformer from switch blade 67 (phase I) is the same as that traced for phase winding 44 of the induction regulator rotor up to the junction point of lines 187 and 188. From this point the circuit continues by way of line 198 through phase winding 52, to the star point 200 of the main transformer winding. Similarly, the circuit for phase winding 53 of the main transformer from switch blade 68 (phase II) is the same as that traced for phase winding 45 of the induction regulator rotor up to the junction point of lines 192 and 193. From this point the circuit continues by way of line 201 through phase winding 53, to star point 200. Also, the circuit for the phase winding 54 of the main transformer from switch blade 69 (phase III) is the same as that traced for phase winding 46 of the induction regulator rotor up to the junction point of lines 195 and 196. From this point the circuit continues by way of line 202 through phase winding 54, to star point 200.

The circuit for the fast speed stator winding of the elevator motor will now be traced. Starting at switch blade 67 (phase I), the circuit for phase winding 35 is by way of line 82 through blow-out coil D 185, contacts D 156, blow-out coil P 186 and contacts P 162, line 187, by way of line 198 through portion 203 of the main transformer phase winding 52, by way of line 204 through contacts S 206 of the slow speed switch, through portions 207 and 208 of auxiliary transformer phase winding 55 in line 210, by way of line 211 through resistance 212, by way of line 213 through the main coil M 214 of protective relay M, by way of segments 145 and 148 of reversing ring 146, bridging contacts 147 and 150, line 215, by way of line 216 through blow-out coil F 205 and contacts F 217 of the fast speed switch and phase winding 35, to the star point 218 of the elevator motor fast speed stator winding. Starting at switch blade 68 (phase II), the circuit for phase winding 36 is by way of line 117 through blow-out coil P 181 and contacts P 163, line 192, by way of line 201 through portion 219 of the main transformer phase winding 53, by way of line 220 through contacts S 222 of the slow speed switch, through portions 223 and 224 of auxiliary transformer phase winding 56 in line 225, by way of line 226 through resistance 227, line 228, by way of line 230 through phase winding 36, to star point 218. Starting at switch blade 69 (phase III), the circuit for phase winding 37 is by way of line 98 through blow-out coil D 183 and contacts D 157, line 195, by way of line 202 through portion 231 of the main transformer phase winding 54, by way of line 232 through contacts S 234 of the slow speed switch, through portions 235 and 236 of auxiliary transformer phase winding 57 in line 237, by way of line 238 through resistance 240, by way of line 241 through the main coil O 242 of protective relay O, by way of segments 154 and 151 of reversing ring 152, bridging contacts 155 and 153, line 243, by way of line 244 through blow-out coil F 233 and contacts F 245 of the fast speed switch and phase winding 37, to star point 218.

With the circuits for the elevator motor as above traced, sufficient voltage is applied to its stator winding to cause the motor to start, the brake being released as a result of the energization of the stator winding of the brake operating motor. The voltage applied to the elevator motor fast speed stator winding at this time is the minimum employed for fast speed operation. The employment of this low voltage prevents the drawing of excess starting currents from the mains and causes a low torque to be exerted by the motor and therefore a smooth starting of the elevator car.

It is to be noted that with the power contacts of the direction and potential switches in engagement and with the movable contacts X 171 and X 174 of the torque motor reversing switch in engagement with stationary forward contacts X 173 and X 176 respectively, the circuits for the stator winding of the torque motor 50 also are completed. The circuit for phase winding 47 may be traced from switch blade 67 (phase I), by way of line 82 through blow-out coil D 185, contacts D 156, blow-out coil P 186 and contacts P 162, line 187, by way of line 198 through portions 203 and 246 of the main transformer phase winding 52, line 247, by way of line 248 through contacts Y 250 of the torque motor resistance switch and resistance 251, through contacts X 173 and X 171, by way of line 252 through phase winding 47, to star point 253 of the torque motor stator winding. The circuit for phase winding 48 may be traced from switch blade 68 (phase II), by way of line 117 through coil P 181 and contacts P 163, line 118, by way of line 254 through phase winding 48, to star point 253. The circuit for phase winding 51 may be traced from switch blade 69 (phase III), by way of line 98 through blow-out coil D 183 and contacts D 157, line 195, by way of line 202 through portions 231 and 255 of the main transformer phase winding 54, line 256, by way of line 257 through contacts Y 258 and resistance 260, through contacts X 176 and X 174, by way of line 261 through phase winding 51, to star point 253.

The stator winding of the torque motor being energized, the torque motor rotor starts its rotative movement in the fast speed direction, driving through chain 262 as previously described to cause the rotative movement of the cams mounted on shaft 263 (see Figure 2). As a result, first contacts FR 264 and FR 265 of the fast speed return switch are caused to engage. The engagement of these contacts is of no particular effect at this time because of the fact that contacts D 160 and D 161 are separated. After the engagement of the fast speed return switch contacts, contacts N 113 of the neutral switch are caused to separate. As these contacts are by-passed by direction switch contacts D 158, their separation is of no particular effect. After the separation of the neutral switch contacts, the torque motor resistance switch contacts Y 250 and Y 258 are separated. This results in the insertion of resistances 266 and 267 in circuit with phase windings 47 and 51 respectively of the stator of the torque motor. The purpose of these resistances will be explained later.

During the time that the torque motor is causing the operation of these switches it also causes rotative movement of the rotor of the induction regulator in the fast speed direction. As will be explained later, this results in a gradual increase in the value of the voltage applied to the fast speed stator winding of the elevator motor. At the same time, the speed of the elevator motor gradually increases, the rate of increase being determined by the rate of increase of applied voltage and the load on the motor. At the time that contacts Y 250 and Y 258 are separated, the rotor of the induction regulator is in such position with relation to the stator that the value of the voltage applied to the fast speed stator winding of the elevator motor is very near the value of the voltage of the supply mains. Continued rotative movement of the induction regulator rotor results in the increasing of the voltage applied to the fast speed stator winding of the elevator motor to a value substantially equal to that of the supply mains. As this point is reached, the torque motor causes the engagement of contacts R 270, R 271 and R 272 of the running switch to connect the elevator motor fast speed stator winding directly to the supply mains for full speed operation. The circuit for elevator motor fast speed stator phase winding 35 may now be traced from switch blade 67, by way of line 82 through blow-out coil D 185, contacts D 156, blow-out coil P 186, contacts P 162, blow-out coil R 273 and contacts R 270, by way of line 213 through coil M 214, by way of segments 145 and 148, bridging contacts 147 and 159, line 215, by way of line 216 through blow-out coil F 205, contacts F 217 and phase winding 35, to star point 218. The circuit for phase winding 36 may be traced from switch blade 68, by way of line 117 through blow-out coil P 181, contacts P 163, blow-out coil R 274 and contacts R 271, line 228, by way of line 230 through phase winding 36, to star point 218. The circuit for phase winding 37 may be traced from switch blade 69, by way of line 98 through blow-out coil D 183, contacts D 157, blow-out coil R 275 and contacts R 272, by way of line 241 through coil O 242, by way of segments 154 and 151, bridging contacts 155 and 153, line 243, by way of line 244 through blow-out coil F 233, contacts F 245 and phase winding 37, to star point 218.

After the torque motor causes the engagement of the running switch contacts to connect the elevator motor fast speed stator winding directly to the supply mains, it is brought to a stop by the compression of bumper spring 259 by the stop arm 268 (Figure 16), as previously explained. The reduction of the voltage applied to the torque motor stator winding and therefore the reduction of the torque of this motor by the inclusion of resistances 266 and 267 in the circuits for the stator winding facilitates the action of spring 259 in damping the rotative movement of the torque motor rotor before it is brought to a stop. Resistances 266 and 267 further serve to limit the flow of current to the torque motor stator winding with the rotor in the fast speed running position, thus reducing power consumption as well as preventing the overheating of the torque motor.

At the time that the speed of the elevator motor reached a certain value during the above described accelerating period, contacts G 279 of the governor switch engaged. The engagement of these contacts completed the maintaining circuits for the stator windings of the direction switch and potential switch operating motors. The maintaining circuit for phase winding D 81 of the stator of the direction switch operating motor may be traced from switch blade 67, line 82, by way of line 83 through contacts G 84, contacts M 85, contacts O 86, safety switch 100 and contacts 91, by way of line 276 through contacts G 279, by way of maintaining ring segment 136, bringing contacts 140 and 138, line 277, contact 74, line 94, by way of line 95 through phase winding D 81, to star point 96. The maintaining circuit for phase winding D 97 may be traced from switch blade 69, line 98, by way of line 101 through contacts G 102, contacts M 103, contacts O 104 and contact 107, line 278, by way of maintaining ring segment 141, bridging contacts 144 and 143, line 280, contact 78, line 111, by way of line 115 through contacts D 158 and phase winding D 97, to star point 96. The maintaining circuit for phase winding D 116 is the same as its operating circuit, previously traced. The maintaining circuit for phase winding P 121 of the stator of the potential switch operating motor may be traced from switch blade 67, line 82, by way of line 83 through contacts G 84, contacts M 85, contacts O 86, safety switch 100 and contact 91, by way of line 276 through contacts G 279, by way of segment 136, bridging contacts 140 and 138, line 277, contact 74, line 94, by way of line 122 through phase winding P 121, to star point 123. The maintaining circuit for phase winding P 124 may be traced from switch blade 69, line 98, by way of line 101 through contacts G 102, contacts M 103, contacts O 104 and contact 107, line 278, by way of segment 141, bridging contacts 144 and 143, line 280, contact 78, line 111, by way of line 115 through contacts D 158, line 114, by way of line 112 through phase winding P 124, to star point 123. The maintaining circuit for phase winding P 125 may be traced from switch blade 68, line 117, line 118, by way of line 128 through contacts P 165 and phase winding P 125, to star point 123. The purpose of these maintaining circuits will be seen from later description.

The engagement of governor switch contacts G 279 also completed a circuit through resistance 281 to phase winding 61 of the stator of the brake operating motor. This circuit may be traced from switch blade 67, line 82, by way of line 83 through contacts G 84, contacts M 85, contacts O 86, safety switch 100 and contact 91, by way of line 276 through contacts G 279, by way of line 178 through resistance 281 and phase winding 61, to star point 180. As a portion of this circuit including resistance 281 is short-circuited by the portion of the circuit previously traced for phase winding 61 through car switch segment 72 and contacts 75 and 73, the resistance serves no particular purpose at this time. The purpose of this resistance, however, will be explained later.

Governor switch contacts G 282 also engaged during the acceleration of the elevator motor, the engagement occurring as the speed of the elevator motor reached a certain value which may be the same as that for which contacts G 279 are set. These contacts, upon engagement, completed a short-circuit for an adjustable portion 283 of resistance 284 in one of the control circuits for the stator winding of the torque motor 50. The purpose of this arrangement also will be seen from later description.

Assume that it is desired to stop the car at a landing, for example the third floor landing. As the car reaches the proper point in the hatchway, the operator returns the car switch to off position. Upon the disengagement of the car switch contact segment 72 and contact 76, the circuit for the actuating coil X 168 of the torque motor reversing switch is broken. The disengagement of this segment and contact 75 removes the short-circuit for resistance 281 for the brake operating motor. As a result, the current supplied to the brake operating motor stator winding and therefore the torque of the motor is reduced sufficiently to permit the brake actuator springs to apply the shoes to the drum. The braking effect obtained is relatively light, however, being determined by the value of resistance 281. This preliminary braking action causes the slowing down of the elevator motor. Further than the above, the disengagement of segment 72 and contacts 75 and 74 and of contact segment 77 and contacts 79 and 78 has no particular effect at this time as the stator windings of the direction switch and potential switch operating motors are maintained energized through their maintaining circuits, above traced.

The torque motor reversing switch drops out as a result of the deenergization of its actuating coil, causing movable contact X 171 to disengage contact X 173 and to engage contact X 172 and causing movable contact X 174 to disengage contact X 176 and to engage contact X 175. As a result, torque motor stator phase winding 47 is disconnected from main 64 (phase I) and connected to main 66 (phase III) and phase winding 51 is disconnected from main 66 and connected to main 64, causing the torque motor rotor to start its rotative movement to return to neutral position. The circuit for phase winding 47 may now be traced from switch blade 69, by way of line 98 through blow-out coil D 183 and contacts D 157, line 195, by way of line 202 through portions 231 and 255 of main transformer phase winding 54, line 256, by way of line 285 through resistance 267, contacts G 282, short-circuiting portion 283 of resistance 284, and the remainder of resistance 284, through contacts X 172 and X 171, by way of line 252 through phase winding 47, to star point 253. The circuit for phase winding 51 may be traced from switch blade 67, by way of line 82 through blow-out coil D 185, contacts D 156, blow-out coil P 186 and contacts P 162, line 187, by way of line 198 through portions 203 and 246 of the main transformer phase winding 52, line 247, by way of line 286 through resistances 266 and 287, through contacts X 175 and X 174, by way of line 261 through phase winding 51, to star point 253. The circuit for phase winding 48 is the same as before.

As soon as the torque motor starts upon its return movement, it causes the separation of running switch contacts R 270, R 271 and R 272 to disconnect the elevator motor fast speed stator winding from the supply mains. As a result, the induction regulator again takes control, decreasing the voltage applied to the elevator motor fast speed stator winding as the position of its rotor with respect to the stator is changed by the reverse rotative movement of the torque motor rotor. Immediately after causing the separation of the running switch contacts, the torque motor causes the reengagement of contacts Y 250 and Y 258 of the torque motor resistance switch. These contacts, upon their reengagement, short-circuit resistances 266 and 267, increasing the voltage applied to the torque motor stator winding. The torque motor thereafter causes the reengagement of neutral switch contacts N 113 and later the separation of fast speed return switch contacts FR 264 and FR 265. The reengagement of the neutral switch contacts has no particular effect as direction switch contacts D 158, by-passing these contacts, are in engagement. As regards the fast speed return switch contacts, their purpose will be explained later.

Owing to the fact that a portion of resistance 284 is short-circuited and that resistances 266 and 267 become short-circuited during the return movement and also that the dash pot piston tends to return the rotative parts to neutral, the rotative movement of the torque motor rotor back to neutral position occurs very quickly. As a result, the reduction of the speed of the elevator motor, due to the preliminary brake application and which might be due also to the reduction of the voltage applied to the elevator motor fast speed stator winding, is not very great. Governor switch contacts G 279 remain in engagement, therefore, as the torque motor rotor reaches neutral position. As a result, the direction and potential switches are held in their operative positions, causing the supply of current to the torque motor stator winding to be maintained. The torque motor, therefore, continues in its rotative movement from neutral in the slow speed direction. As a result of this continued movement, contacts F 217 and F 245 of the fast speed switch are caused to separate, breaking the circuits for the elevator motor fast speed stator winding. Immediately after the separation of these contacts, the torque motor causes the separation of slow speed switch contacts S 206, S 222 and S 234, then the engagement of fast speed switch contacts F 287, F 288 and F 289 and then the engagement of slow speed switch contacts S 291 and S 292.

As previously explained, the reverse rotative movement of the torque motor rotor from the fast speed position to neutral occurs very rapidly. The rotor of the torque motor and the rotating parts of the associated apparatus, therefore, will develop considerable momentum during this rotative movement. The dash pot mechanism, however, acts in the manner previously described to retard the rotative movement and therefore decrease the momentum just before neutral position is reached. This retarding action is only momentary, however, so that immediately the circuit for the elevator motor fast speed stator winding is broken by the separation of contacts F 217 and F 245 the circuit for the elevator motor slow speed stator winding is completed by the engagement of contacts S 291 and S 292. The circuit for slow speed stator phase winding 32 may be traced from switch blade 67, by way of line 82 through blow-out coil D 185, contacts D 156, blow-out coil P 186 and contacts P 162, line 187, by way of line 198, through portions 203 and 246 of the main transformer phase winding 52, by way of line 210, through contacts F 287, resistance 294 and the whole of auxiliary transformer phase winding 55, by way of line 211, through resistance 212, by way of line 213, through coil M 214, by way of segments 145 and 148, bridging contacts 147 and 150, line 215, by way of line 295, through blow-out coil S 293, contacts S 291 and phase winding 32, to star point 296. The circuit for slow speed stator phase winding 33 may be traced from switch blade 68, by way of line 117 through blow-out coil P 181 and contacts P 163, line 192, by way of line 201, through portions 219 and 297 of the main transformer phase winding 53, by way of line 225, through contacts F 288, resistance 300 and the whole of auxiliary transformer phase winding 56, by way of line 226, through resistance 227, line 228, by way of line 301, through phase winding 33 to star point 296. The circuit for slow speed stator phase winding 34 may be traced from switch blade 69, by way of line 98, through blow-out coil D 183 and contacts D 157, line 195, by way of line 202, through portions 231 and 255 of the main transformer phase winding 54, by way of line 237, through contacts F 289, resistance 303 and the whole of auxiliary transformer phase winding 57, by way of line 238, through resistance 240, by way of line 241, through coil O 242, by way of reversing ring segments 154 and 151, bridging contacts 155 and 153, line 243, by way of line 304 through blow-out coil S 302, contacts S 292 and phase winding 34 to star point 296.

As the rotor of the elevator motor is rotating considerably above the synchronous speed for the slow speed stator winding at the time of the change from the fast speed to the slow speed stator winding, powerful braking currents are generated, slowing down the motor. The voltage applied to the slow speed stator winding at the instant the change of connections is effected is a minimum for slow speed operation and is preferably of a lower value than that of the minimum fast speed voltage. The manner in which this lower voltage is obtained will be set forth later although it may be explained briefly at this point that it is due to the change of transformer connections. As the torque motor continues its rotative movement, the voltage applied to the slow speed stator winding is increased, owing to the change of angular position of the induction regulator rotor with respect to the stator. This increasing of the voltage applied to the slow speed stator winding results in increasing the excitation of the elevator motor with consequent increasing of the braking effect.

During the change of connections from the fast to the slow speed stator winding, the torque motor also caused the engagement of the slow speed return switch contacts SR 305 and SR 306. The engagement of these contacts is of no particular effect at this time because of the fact that contacts D 160 and D 161 are still separated. It also caused the separation of neutral switch contacts N 113. As contacts D 158 are still in engagement, the separation of the neutral switch contacts has no particular effect. During the continued rotative movement of the torque motor rotor, it causes the separation of torque motor resistance switch contacts Y 250 and Y 258. The separation of these contacts reinserts resistances 266 and 267 in the torque motor stator winding circuits. After the separation of the contacts of the torque motor resistance switch, the rotor of the torque motor is brought to a stop by the compression of bumper spring 309 by stop arm 268. The reduction of the voltage applied to the torque motor stator winding and therefore the reduction of the torque of this motor by the re-inclusion of resistances 266 and 267 in the circuits for the stator winding facilitates the action of spring 309 in damping the rotative movement of the torque motor rotor before it is brought to a stop. As when included in the circuit with the torque motor stator winding with the rotor at rest in fast speed position, resistances 266 and 267 also act to reduce power consumption and prevent overheating of the torque motor when in slow speed position.

As soon as the speed of the motor has decreased to a certain value, preferably somewhat above synchronous speed for the slow speed stator windings, governor switch contacts G 279 and G 282 separate (assuming that contacts G 282 are set the same as contacts G 279). The separation of contacts G 282 breaks the short-circuit for portion 283 of resistance 284. As a result of the separation of contacts G 279, the maintaining circuits for phase windings D 81 of the stator of the direction switch operating motor, phase winding P 121 of the stator of the potential switch operating motor and phase winding 61 of the brake operating motor are broken. Thus, the remaining phase windings of these motors being now connected for single phase operation, the motors lose their torque. The direction switch and potential switch operating motors are therefore returned to their off positions by the action of their respective weights 307 and 308 (Figure 4). As a result of these return movements, first power contacts D 156, D 157, P 162 and P 163 and auxiliary contacts D 158, P 164 and P 165 separate. Then segment 87 of interlock ring 88 moves back into engagement with contact 130, segment 105 of interlock ring 106 moves back into engagement with contact 133, segment 136 of maintaining ring 137 disengages contact 138, segment 141 of maintaining ring 142 disengages contact 143, segments 145 and 148 of reversing ring 146 disengage contacts 147 and 150 respectively, and segments 151 and 154 of reversing ring 152 disengage contacts 153 and 155 respectively.

The disengagement of auxiliary contacts D 158 breaks the circuits for the remaining direction switch and potential switch operating motor stator phase windings. The disengagement of auxiliary contacts P 165 breaks the short circuit for resistance 127. The disengagement of contacts P 164 is simply in preparation for the next starting operation, the circuit for the torque motor reversing switch actuating coil X 168 having been broken when the car switch was returned to off position. The disengagement of the power contacts of the direction and potential switches breaks the circuits common to the remaining phase windings of the brake operating motor, two of the phase windings of the torque motor stator, the induction regulator primary or rotor winding, the main transformer winding and the slow speed stator winding of the elevator motor.

At the same time that the direction and potential switch operating motors are being returned to their off positions, the brake operating motor, as a result of the loss of its torque, is returned to full brake applied position, the brake actuator springs applying the brake shoes with full pressure to the brake drum.

Thus the brake being fully applied and the circuits for the elevator motor slow speed stator winding being broken, the elevator car is brought to a stop.

Immediately after the separation of the direction and potential switch power contacts, the direction switch operating motor caused the reengagement of auxiliary contacts D 160 and D 161. The engagement of these contacts completed the circuits for causing the torque motor to return from its slow speed position to neutral. The circuit for phase winding 47 of the torque motor stator may be traced from switch blade 67, line 82, by way of line 83 through contacts G 84, contacts M 85 and contacts O 86, by way of line 166 through the auxiliary coil M 310 of the protective relay M, resistance 311 and contacts D 160, by way of line 312 through slow speed return switch contacts SR 305, line 313, line 285, through contacts X 172 and X 171, by way of line 252 through phase winding 47, to star point 253. The circuit for phase winding 51 may be traced from switch blade 69, line 98, by way of line 101 through contacts G 102, contacts M 103 and contacts O 104, by way of line 167 through auxiliary coil O 314 of the protective relay O, resistance 315 and contacts D 161, by way of line 316 through slow speed return switch contacts SR 306, line 317, line 286, through contacts X 175 and X 174, by way of line 261 through phase winding 51, to star point 253. The circuit for phase winding 48 from switch blade 68 is the same as previously traced.

It is to be noted that the phase windings of the torque motor stator were thus reconnected to the same mains to which they were connected for causing rotative movement of the motor in the fast speed direction from neutral. As a result, during the stopping of the elevator motor, the torque motor causes rotative movement of the induction regulator rotor from its slow speed position toward neutral. During this movement, contacts Y 250 and Y 258 are caused to reengage, then contacts N 113 are caused to reengage, then contacts S 291 and S 292 are caused to separate, then contacts F 287, F 288 and F 289 are caused to separate, and then contacts S 206, S 222 and S 234 are caused to engage. At substantially the same time that the engagement of contacts S 206, S 222 and S 234 occurs, the slow speed return switch contacts SR 305 and SR 306 are caused to separate. As a result, the torque motor stator winding is deenergized. The torque motor rotor and the rotating parts of its associated apparatus have sufficient momentum, however, to move on the neutral position where they are brought to rest by the action of the dash pot. Just before neutral position is reached, contacts F 217 and F 245 of the fast speed switch reengage.

Should the car be brought to rest short of the landing, in the present example, below the third floor landing, it may be brought to the landing by the process of inching. This is preferably accomplished by throwing the car switch all the way over and then centering it just before the landing is reached. Assuming that the car stopped below the third floor landing, to bring it up to the landing level, the operator moves the car switch into its fast speed up position. The car is started in the same manner as previously described. Upon returning the car switch to off position to stop the car, however, owing to the fact that the car can attain only a relatively low speed in such a short space, a different stopping operation takes place. The governor contacts G 279 do not engage when the speed of the car is low so that no maintaining circuits are established for the direction switch and potential switch operating motor stator windings and no circuit is established through resistance 281 for phase winding 61 of the brake operating motor. Thus upon the return of the car switch to off position to stop the car, the potential switch and direction switch operating motors are immediately deenergized and are returned to their off positions. As previously explained, this results in the breaking of the circuit for the fast speed stator winding of the elevator motor. At the same time, the brake operating motor is returned to its full brake applied position, permitting the brake actuating springs to apply the brake shoes with full pressure to the brake drum to bring the car to a stop.

The reengagement of contacts D 160 and D 161, during the return of the direction switch operating motor to off position, completes the circuits for returning the torque motor rotor to neutral position. The circuit for phase winding 51 of the torque motor stator may be traced from switch blade 67, line 82, by way of line 83 through contacts G 84, contacts M 85 and contacts O 86, by way of line 166 through coil M 310, resistance 311 and contacts D 160, by way of line 317 through contacts FR 264 (these contacts having been closed by the torque motor during the starting of the car), line 286, through contacts X 175 and X 174 (in engagement as a result of the deenergization of coil X 168 upon the return of the car switch to off position), by way of line 261 through phase winding 51, to star point 253. The circuit for phase winding 47 may be traced from switch blade 69, line 98, by way of line 101 through contacts G 102, contacts M 103 and contacts O 104, by way of line 167 through coil O 314, resistance 315 and contacts D 161, by way of line 313 through contacts FR 265, line 285, through contacts X 172 and X 171, by way of line 252 through phase winding 47, to star point 253. The circuit for phase winding 48 from switch blade 68 is the same as previously traced. Assuming the torque motor rotor has not reached fast speed position, with these return circuits established, the torque motor reverses and, after the separation of the fast speed return switch contacts, it is brought to rest with the rotor in neutral position in the manner previously described. It is believed that the operation of returning the car to the landing in the event that it passes beyond the third floor landing before stopping will be understood from the description of starting the car in the down direction.

The starting of the car in the down direction is accomplished in a manner similar to that described for starting it in the up direction and will therefore be only briefly described. The operator moves the car switch into position where segment 72 bridges contacts 320, 321, 132 and 322 and segment 77 bridges contacts 323 and 135. Upon the engagement of segment 72 with contact 132 and segment 77 with contact 135, circuits are completed for the stator windings of the direction switch and potential switch operating motors for down operation, direction switch motor phase winding D 81 and potential switch motor phase winding P 121 being connected to phase III of the supply mains (switch blade 69), phase windings D 97 and P 124 to phase I (switch blade 67) and phase windings D 116 and P 125 to phase II (switch blade 68).

The circuit for phase winding D 81 from switch blade 69 leads to contact 107, this portion of the circuit having been previously traced, thence by way of interlock ring segment 105, bridging contacts 107 and 133, line 134, by way of segment 77 bridging contacts 135 and 323, line 122, line 94, by way of line 95 through phase winding D 81, to star point 96. The circuit for phase winding P 121 is the same as for phase winding D 81 up to the point where line 94 branches off line 122. Line 122, however, continues past this point through phase winding P 121 to star point 123. The circuit for phase winding D 97 from switch blade 67 leads to contact 91, this portion of the circuit having been previously traced, thence by way of interlock ring segment 87, bridging contacts 91 and 130, line 131, by way of segment 72 bridging contacts 132 and 321, by way of line 112 through contacts N 113, line 114, by way of line 115 through phase winding D 97, to star point 96. The circuit for phase winding P 124 is the same as for phase winding D 97 up to the point where line 114 branches off line 112. Line 112, however, continues past this point through phase winding P 124 to star point 123. The circuits for phase windings D 116 and P 125 are the same as traced for starting in the up direction.

The direction and potential switch operating motors, having their stator windings energized, move into their down operative positions. Owing to their reversed movement, interlock ring segment 87 moves off contact 92 and interlock ring segment 105 moves off contact 108, breaking the circuits to the up feed contacts 75 and 79 respectively, maintaining ring segments 136 and 141 move into engagement with contacts 324 and 325 respectively, and segments 326 and 327 of reversing ring 146 and segments 328 and 330 of reversing ring 152 move into engagement with contacts 147, 150, 153 and 155 respectively. As in the case where the car was started in the up direction, these motors also cause the separation of contacts D 160 and D 161 and the engagement of contacts D 156, D 157, D 158, P 162, P 163, P 164 and P 165.

The engagement of the power contacts of the direction and potential switches completes the circuits for the stator winding of the brake operating motor as before with the exception that the circuit for phase winding 61 is by way of contact 130, line 131, contacts 132 and 320, bridged by segment 72, instead of by way of contact 92, line 93, contacts 75 and 73. The engagement of these power contacts also completes the circuits for the fast speed stator winding of the elevator motor, this time, however, for down operation, elevator motor phase winding 35 being connected to phase III of the supply mains (switch blade 69), phase winding 37 to phase I (switch blade 67) and phase winding 36 to phase II (switch blade 68).

The circuit for phase winding 35 from switch blade 69 may be traced by way of line 98 through blow-out coil D 183 and contacts D 157, line 195, by way of line 202 through main transformer winding portion 231, by way of line 232 through contacts S 234, through auxiliary transformer winding portions 235 and 236, by way of line 238 through resistance 240, by way of line 241 through coil O 242, contact 155, segment 330, line 331, segment 327, contact 150, line 215, by way of line 216 through blow-out coil F 205, contacts F 217 and phase winding 35, to star point 218. The circuit for phase winding 37 from switch blade 67 may be traced by way of line 82 through blow-out coil D 185, contacts D 156, blow-out coil P 186 and contacts P 162, line 187, by way of line 198, main transformer winding portion 203, by way of line 204 through contacts S 206, through auxiliary transformer winding portions 207 and 208, by way of line 211 through resistance 212, by way of line 213 through coil M 214, contact 147, segment 326, line 332, segment 328, contact 153, line 243, by way of line 244 through blow-out coil F 233, contacts F 245 and phase winding 37, to star point 218. The circuit for phase winding 36 from switch blade 68 is the same as traced for starting the car in the up direction.

The brake being released and the elevator motor fast speed stator winding being energized, the elevator car is started in the down direction.

The torque motor reversing switch actuating coil X 168 is energized during starting in the down direction in the same manner as described for starting the car in the up direction, the circuit for this coil, however, being by way of line 131, car switch contacts 132 and 322 and line 333. As a part of the above described starting operation, therefore, switch X operates to cause movable contacts X 171 and X 174 to engage stationary contacts X 173 and X 176. With these contacts and the power contacts of the direction and potential switches in engagement to connect the stator winding of the torque motor to the mains for operation in the fast speed direction, the torque motor causes the operation of fast speed, neutral and torque motor resistance switches and the increase in value of voltage applied to the elevator motor fast speed stator winding. Thereafter, the torque motor causes the operation of the running switch to connect the elevator motor fast speed stator winding to the mains. Further than the above, the operation of the system during the starting of the car in the down direction is the same as that described for starting in the up direction.

The stopping of the elevator car when it is traveling in the down direction is accomplished in a manner similar to that described for stopping the car in the up direction and will not be described.

The car may be started on the elevator motor slow speed stator windings if desired. For example, assume that it is desired to start the car in the up direction on the slow speed winding. The operator moves the car switch only to the position where segment 72 engages contact 75 and segment 77 engages contact 79. Circuits are thereupon completed for the stator windings of the direction and potential switch operating motors, causing these motors to operate in the same manner as described for starting the car in the up direction on the fast speed winding. Owing to the fact that the actuating coil X 168 of the torque motor reversing switch is not energized, contact X 171 remains in engagement with contact X 172 and contact X 174 remains in engagement with contact X 175 so that the engagement of the power contacts of the direction and potential switches completes the circuits for the torque motor stator winding for causing movement of the torque motor rotor in the slow speed direction. Upon the initial movement of the torque motor rotor in the slow speed direction, contacts F 217, F 245, S 206, S 222 and S 234 are separated and contacts F 287, F 288, F 289, S 291 and S 292 are engaged. Thus, with the power contacts of the direction and potential switches in engagement, the elevator motor slow speed stator winding is connected to the mains.

As previously set forth, the engagement of the power contacts also causes the energization of the brake operating motor stator windings to effect the release of the brake. During the movement of the torque motor rotor from neutral to slow speed position, it causes the engagement of the slow speed return switch contacts, the separation of the neutral switch contacts and the separation of the torque motor resistance switch contacts, as previously explained. It also causes the change in angular position of the induction regulator rotor with respect to the stator to gradually increase the voltage applied to the slow speed stator winding of the elevator motor. Thus the elevator motor starts and comes up to slow speed.

The car switch may be shifted to full on position in the event that it is desired to change from slow to fast speed or the car may be permitted to continue in motion at slow speed until it is desired to stop, whereupon the car switch is returned to off position. Upon the car switch being returned to off position, the elevator motor slow speed winding is deenergized and the brake is applied to stop the motor as previously described. The torque motor is energized to return to neutral through the previously traced circuits including the slow speed return switch contacts. Slow speed may be utilized in inching operations if desired.

Figure 20:
Figure 20 is a simplified representation of a single phase induction regulator.
Figure 21:
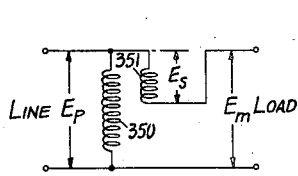
Figure 21 is a simplified diagram illustrating circuit connections for the same.
Figure 23:
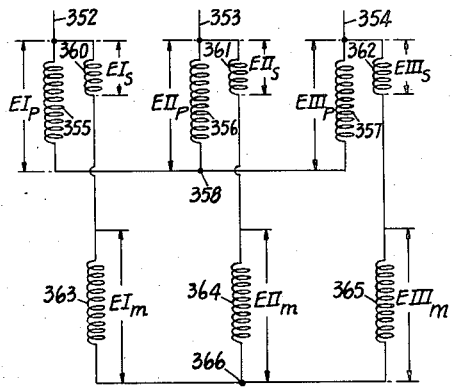
Figure 23 is a simplified diagram illustrating connections for a polyphase induction regulator.
Figure 24:
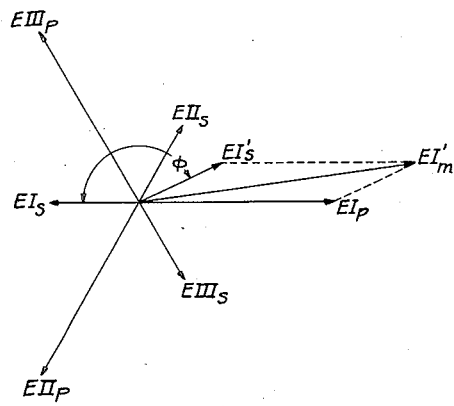
Figure 24 is a vector diagram employed to illustrate the operation of the same.

In order that the operation of the induction regulator may be readily understood, reference may be had to Figures 23 and 24. This regulator may be regarded as a special type of transformer capable of varying the voltage impressed on the load, although its construction may be the same as that of an induction motor with a wound rotor. It is believed that the operation of the induction regulator will be rendered more clear by first considering the operation of a simplified single phase unit. Such a unit is illustrated in Figure 20. The primary winding 350 is wound on the rotor and the secondary winding 351 is wound on the stator, the rotor being rotatable on an axis in the plane of the stator winding. As indicated in the diagram (Figure 21), the primary winding is connected across the line while the secondary winding is connected to the load in series with the line. The primary exciting current produces an alternating flux which induces a voltage in the secondary winding. This secondary voltage varies with the position of the primary winding, but it always adds to or subtracts from the line voltage. In Figure 20 all the flux of the primary winding (neglecting leakage) passes through the secondary winding and the induced voltage is a maximum. This maximum voltage may be regarded as in opposition to the line voltage and therefore the minimum voltage will be impressed on the load.

Figure 22:
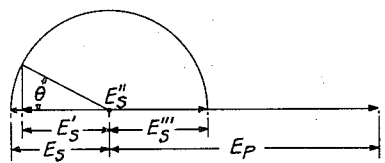
Figure 22 is a vector diagram employed to illustrate the operation of the same.

The conditions obtained are illustrated vectorially in Figure 22. $E_p$ represents the voltage impressed on the primary winding (line voltage) and $E_s$ represents the maximum secondary induced voltage with the relationship of the primary and secondary windings as indicated in Figure 20. The load voltage $E_m$, therefore, is the algebraic sum of the line and secondary voltages and equals $E_p - E_s$. When the primary winding is turned through an angle $\theta$, only part of the primary flux passes through the secondary winding and the secondary voltage is reduced approximately in the ratio of $1 : \cos \theta$ to a value $E_s'$. This voltage, however, is still in opposition to the line voltage. The load voltage, therefore, becomes $E_p - E_s'$. With the primary winding at right angles to the secondary winding, none of the primary flux passes through the secondary coil and there is no secondary induced voltage, as indicated by $E_s''$. The load voltage therefore is the line voltage. When the primary winding has been turned through 180 degrees, the secondary voltage is again maximum, as indicated by $E_s'''$ but is in phase with the line voltage. Thus the load voltage is $E_p + E_s'''$. It will be seen that a gradual increase in load voltage is obtained as the primary winding is turned from the position indicated in Figure 20 through an angle of 180 degrees and that this gradual increase is obtained regardless of whether this rotative movement is clockwise or counter-clockwise.

A polyphase regulator has a polyphase primary or rotor winding which is connected to the polyphase source. The secondary or stator is wound with the same number of phases as the primary and each phase winding is connected in series with the phase of the source to which its primary phase winding is connected and one phase of the load. These circuit connections are illustrated in the diagram (Figure 23). In this diagram 352, 353 and 354 indicate the three phases of the source. The primary or rotor phase windings are designated 355, 356 and 357 with the star point designated 358. The secondary or stator phase windings are designated 360, 361 and 362. The load is represented by the stator winding of an induction motor, the phase windings of this motor being designated 363, 364 and 365 and the star point 366.

When polyphase current flows in the primary winding of the regulator, a revolving magnetic field is produced of constant value, as in the case of an induction motor stator. As the primary winding is turned, the magnitude of the revolving field is not changed and therefore the magnitude of the secondary voltages is not changed. However, the phase relations of the secondary voltages with respect to the voltages impressed on the primary phase windings are changed so that a variation of the load voltages is obtained. This is vectorially illustrated in Figure 24. $EI_p$, $EII_p$ and $EIII_p$ represent the voltages impressed on the primary phase windings of the regulator and $EI_s$, $EII_s$ and $EIII_s$ represent the induced voltages in the secondary phase windings when these windings are in such angular relation with respect to their primary phase windings that the induced voltages are in opposition to the voltages impressed on these primary windings. The load voltages $EI_m$, $EII_m$ and $EIII_m$, therefore, are the vector sums of the primary and secondary voltages and are equal to $EI_p - EI_s$, $EII_p - EII_s$ and $EIII_p - EIII_s$ respectively. It is believed that the action of the regulator when the primary is turned will be better understood by considering the conditions for only one phase, for example phase I. When the primary is turned through an angle Φ, the voltage induced in a secondary phase winding 360 becomes $EI_s'$, equal in magnitude to $EI_s$ but with its phase relation with respect to the primary voltage $EI_p$ changed owing to the fact that this winding is under the influence of the fluxes due to primary phase windings 356 and 357 as well as phase winding 355. The load voltage, being the vector sum of the primary and secondary voltages, becomes $EI_m'$. It will be seen, therefore, that a gradual increase in the value of the load voltage $EI_m$ is obtained as the primary is turned from the position where the induced voltage is $EI_s$, in opposition to the primary voltage $EI_p$, through an angle of 180 degrees and that this gradual increase is obtained regardless of whether the rotative movement is clockwise or counter-clockwise. A similar increase in the value of the load voltages $EII_m$ and $EIII_m$ is also obtained during this turning movement as a result of the changes of phase relations of the induced voltages $EII_s$ and $EIII_s$ with respect to the primary voltages $EII_p$ and $EIII_p$.

Referring again to Figure 19, the transformers shown are utilized to obtain the desired voltage values. These are the main and auxiliary transformers previously described. As was seen during previous descriptions, both the main transformer and the auxiliary transformer are autotransformers. Considering only the conditions for phase I, since the conditions for the other phases are the same, the whole of main transformer phase winding 52 serves as the primary while the whole phase winding minus portion 203 serves as the fast speed secondary and the whole phase winding minus portions 203 and 246 serves as the slow speed secondary. As regards auxiliary transformer phase winding 55, portion 208 serves as the primary while portions 208 and 207 serve as the fast speed secondary and the whole phase winding serves as the slow speed secondary. Assuming the value of the voltage across the phases of the source as 220 volts, the value of the voltage impressed on main transformer phase winding 52 is approximately 127 volts, since the transformer is star connected. Assume also that the value of the voltage across portion 203 of main transformer phase winding 52 is 30 volts and that across portions 203 and 246 of main transformer phase winding 52 is 50 volts. The value of the voltage impressed on the induction regulator rotor or primary phase winding 44 also is 127 volts. The value of the voltage induced in the regulator stator or secondary phase winding 41 will be assumed as 20 volts. This voltage is impressed on the primary of auxiliary transformer phase winding 55 (portion 208). It will be further assumed that the value of the voltage induced in the auxiliary transformer fast speed secondary (portions 208 and 207) is 30 volts and that induced in the slow speed secondary (the whole winding) is 50 volts.

Assuming that the elevator motor is being started in the up direction on the fast speed winding, the voltage applied to the elevator motor fast speed stator phase winding 35 is the vector sum of the voltage across main transformer fast speed secondary, i. e., phase winding 52 exclusive of portion 203, (127 volts−30 volts) 97 volts, and the voltage induced in the auxiliary transformer fast speed secondary (portions 208 and 207), 30 volts. The regulator rotor is set so that the voltage induced in the auxiliary transformer phase winding is in direct phase opposition to that of the line, i. e., that impressed on the main transformer phase winding, when the torque motor rotor is midway between the position where fast speed contacts F 217 and F 245 separate and the position where slow speed switch contacts S 291 and S 292 engage. Since the torque motor rotor is in neutral position with the elevator car at rest, at the instant that the circuit connections for starting are established, the voltage induced in the auxiliary transformer phase winding is substantially in direct phase opposition to the voltage impressed on the main transformer phase winding. The voltage impressed on elevator motor fast speed stator phase winding 35 at the instant of starting, therefore, is approximately 97 volts−30 volts or 67 volts. As the phase relation of the regulator secondary voltage is changed with respect to that of the regulator primary by the rotative movement of the primary winding in the fast speed direction, a corresponding change of the phase relation of the auxiliary transformer fast speed secondary voltage occurs with respect to the voltage impressed on phase winding 52 of the main transformer. Thus the voltage impressed on elevator motor fast speed stator phase winding 35 is gradually increased. As previously explained, when the voltage impressed on winding 35 has reached a value substantially equal to that of the line, i. e., 127 volts, the winding is connected directly to the line by the engagement of the running switch contacts.

Assume that the elevator motor is being started in the up direction on the slow speed winding. The voltage applied to the elevator motor slow speed winding 32 is the the vector sum of the voltage across main transformer slow speed secondary, i. e., phase winding 52 exclusive of portions 203 and 246, (127 volts−50 volts) 77 volts, and the voltage across auxiliary transformer phase winding 55 (the slow speed secondary), 50 volts. At the instant that the circuit connections for the elevator motor slow speed winding are established, the voltage induced in auxiliary transformer phase winding 55 is substantially in direct phase opposition to the voltage impressed on the main transformer phase winding. The voltage impressed on elevator motor slow speed stator phase winding, therefore, is approximately 77 volts—50 volts or 27 volts. As the phase relation of the regulator secondary voltage is changed with respect to that of the regulator primary by the rotative movement of the primary winding in the slow speed direction, a corresponding change of the phase relation of the auxiliary transformer slow speed secondary voltage occurs with respect to the voltage impressed on phase winding 52 of the main transformer. Thus the voltage impressed on the elevator motor winding 32 is gradually increased up to a point where it reaches a value substantially equal to that of the line, whereupon the torque motor rotor is brought to a stop as previously explained. Owing to the fact that the torque of the elevator motor varies as the square of the voltage impressed on the stator winding and that the voltage impressed on the slow speed stator winding at the instant that the circuit connections are established is of relatively low value, the motor may not start immediately. As the angular position of the regulator rotor with respect to the stator is changed, however, a point is reached where the voltage impressed on the slow speed winding is of sufficient value to cause the elevator motor to start.

As the increasing of the voltage applied to the elevator motor windings is accomplished in the same manner when starting in the down direction, no description is believed necessary.

Upon the initiation of the stopping operation, with the elevator motor running at fast speed, the elevator motor fast speed stator winding is immediately connected for induction regulator control and the voltage applied to the winding is rapidly reduced, due to the reverse rotative movement of the regulator rotor, as the torque motor rotor approaches neutral position. Upon the disconnection of the fast speed winding and the connection of the slow speed winding, the voltage applied to the slow speed winding is increased in the same manner as described for starting on this winding. Thus the excitation of the motor is increased for the braking action.

It is to be understood that the values of voltage assumed for the above explanation are arbitrary, being chosen merely to illustrate the principles of operation.

The induction regular control not only has the advantage that the voltage applied to the stator windings of the elevator motor may be gradually and smoothly changed during starting and stopping but also has the advantage that it is economical in power consumption. For example, assuming that in starting the regulator causes only half line voltage to be applied to the motor, the line current is half the motor current. Thus the loading up of the line with excessive starting currents is prevented.

Resistances 212, 227 and 240, connected in circuit with the fast speed stator phase windings of the elevator motor during starting, are shock resistances These resistances prevent the rise of the motor currents to excessive values at the instant of starting due to unbalanced voltage conditions in the mains. Resistances 294, 300 and 303 act in a similar manner to assist resistances 212, 227 and 240 when the slow speed winding is connected for operation.

A quick reversal may be effected by throwing the car switch from one operative position to the other. Injury to the system is prevented under such conditions of operation by the interlock rings 88 and 106. For convenience of illustration, assume that the elevator car is running at full speed in the up direction and that the operator throws the car switch into full down position to reverse the direction of car movement. When running at full speed in the up direction, however, segment 87 of ring 88 is disengaged from contact 130, so that the circuit leading to car switch down feed contact 132 is broken, and segment 105 of ring 106 is disengaged from contact 133, so that the circuit leading to car switch down feed contact 135 is broken. As these rings are maintained in these positions until the direction switch operating motor is deenergized and as this motor is maintained energized by contacts G 279 of the governor switch, the elevator motor, and therefore the car, cannot be reversed until the speed of the car drops to the low value at which these governor switch contacts are set.

The elevator car may be brought to a quick stop in case of an emergency by opening safety switch 100. The opening of this switch breaks the circuit common to one of the stator phase windings of the direction switch operating motor, one of the stator phase windings of the potential switch operating motor and phase winding 61 of the brake operating motor. As a result, the direction and potential switches are returned to off positions, causing the deenergization of the stator winding of the elevator motor, and the brake is fully applied, bringing the car to a stop. The car is brought to a stop in the same manner by the separation of contacts G 84 and contacts G 102 of the governor switch. These contacts are for protecting the system in case of dangerous overspeed and are set to separate whenever the speed of the elevator car reaches a predetermined value. It is preferred to include one pair of these contacts, i. e., contacts G 84, in line 83 and the other pair, contacts G 102, in line 101, thus causing the breaking of these circuits for two phases of each of the above operating motors when overspeed occurs. The car is also brought to a stop in the same manner upon the operation of either or both of the protective relays O and M, the contacts M 85, O 86, M 103 and O 104 of these relays being arranged in lines 83 and 101.

As has previously been described, each of these protective relays is provided with a dash pot for timing its operation. The timing of each relay permits it to be set to operate when the current flowing in its main coil (for example, coil M 214 of relay M) reaches a value just slightly above that of full load current of the elevator motor, the dash pot preventing the separation of the relay contacts under ordinary operating conditions or in case of temporary overloads. In the event that current of a value for which the relay is set continues to flow for a predetermined time interval, the relay operates to separate its contacts. In case of heavier current flow, as in the case of considerable overload, the time element of the relay is shortened. It is to be noted that main coil M 214 of relay M is connected in line 213 and that main coil O 242 of relay O is connected in line 241 so that protection is had in the event of an overload in all phases or in any one phase. Thus one of the relays operates to protect the elevator motor against an overload condition resulting from single phasing, caused for example by the blowing of a fuse (not shown) in one line.

The auxiliary coil of each relay is set so as to cause the operation of the relay as soon as the circuit through the coil is completed, the immediate separation of the relay contacts being prevented as before, however, by the action of the dash pot. The circuits for these auxiliary coils are completed by the engagement of the direction switch auxiliary contacts D 160 and D 161 to effect the return of the torque motor rotor to neutral. The dash pots are set so that the torque motor rotor is normally returned to neutral and its circuits broken by the separation of the contacts of one of the return switches (SR or FR) before the separation of the protective relay contacts can be effected. Should the torque motor stall or continue in operation an undue length of time, however, the separation of the contacts of the protective relays occurs to open lines 83 and 101. Thus the torque motor stator winding is deenergized. Similar protection is afforded in case of single phasings. Thus these relays are effective not only to protect the elevator motor but the torque motor as well.

Contacts N 113 of the neutral switch are provided to prevent the application of voltage to the elevator motor stator windings of considerably higher value than that employed for starting. In order that it may be understood how this protection is obtained, assume that the neutral switch is not provided and that the supply of power from the mains fails while the torque motor rotor is in fast speed position. Although the car is brought to a stop, the torque motor rotor remains in fast speed position. In attempting to start the car, the operator might hold the car switch in full on position. Thus, upon power being restored, the direction and potential switches would immediately operate and, as the torque motor would not have time to move very far toward neutral before the engagement of the direction and potential switch power contacts, substantially full line voltage would be applied to the elevator motor fast speed stator winding. With the neutral switch provided, however, contacts N 113 would be separated at the time power was restored, preventing the immediate energization of the direction switch and potential switch operating motors. As seen from previous description, these contacts do not engage until the torque motor rotor has completed the major portion of its movement toward neutral. The engagement of these contacts completes the circuits for the direction and potential switch operating motors. By the time that these motors have operated to cause the engagement of the power contacts, the torque motor rotor will have returned to neutral or so near to neutral that the voltage applied to the fast speed stator winding of the elevator motor will be practically the normal starting voltage. It will be seen, therefore, that this protection is afforded so long as the neutral switch contacts are separated regardless of the position of the torque motor rotor.

A further safety feature is obtained by the arrangement of the power contacts of the direction and potential switches. As has been seen from previous description, the direction switch power contacts D 156 and D 157 are arranged in lines 82 and 98 respectively (phases I and III) while potential switch power contacts P 162 and P 163 are arranged in lines 82 and 117 respectively (phases I and II). Thus, if either the potential switch motor or direction switch motor fails to operate upon the throwing of the car switch to an operative position, its power contacts, remaining separated, prevent the energization of the elevator motor, the brake operating motor and the other apparatus.

The transformer phase windings of both the main and auxiliary transformers are provided with a plurality of taps to permit adjustments to be made. This has been indicated on the drawings by arrows on the connecting ends of the leads. The number of turns included in the various transformer portions are adjusted after the system is installed to give the desired operation. Smooth acceleration and retardation in a minimum of time is of primary importance in elevator installations and it is in the interest of smooth retardation that the system is adjusted so that the minimum slow speed voltage is of a relatively low value. If a higher voltage, for example voltage of a value equal to the fast speed starting voltage, were applied to the elevator motor slow speed stator winding as the connections are changed during retardation, a stronger elevator motor excitation would be obtained and the initial electrical braking action would be considerably stronger. This would result in a sharp decrease in car speed which might cause considerable discomfort to passengers.

As has been seen from previous description, during starting of the car (assuming for convenience of explanation that the car is being started in the up direction) reversing ring segments 145 and 148 engage contacts 147 and 150 and segments 151 and 154 engage contacts 153 and 155 before the engagement of the power contacts of the direction and potential switches. Therefore, during the stopping operation, the power contacts separate before the disengagement of these segments and contacts occurs. Thus the circuits are made and broken at the power contacts, entirely eliminating arcing at the reversing rings. These power contacts are protected by blow-out coils. The contacts of the running switch R are also protected by blow-out coils. It has also been set forth previously that, during change-over from the fast to the slow speed winding of the elevator motor, fast speed switch contacts F 217 and F 245 separate before the separation of slow speed switch contacts S 206, S 222 and S 234 and fast speed switch contacts F 287, F 288 and F 289 engage before the engagement of slow speed switch contacts S 291 and S 292. During a change from the slow to the fast speed winding these contacts operate in the reverse sequence so that contacts S 291 and S 292 separate before the separation of contacts F 287, F 288 and F 289 and contacts S 206, S 222 and S 234 engage prior to the engagement of contacts F 217 and F 245. Thus the circuits for the slow speed winding are made and broken by contacts S 291 and S 292 and the circuits for the fast speed winding are made and broken by contacts F 217 and F 245, entirely eliminating arcing at contacts S 206, S 222, S 234, F 287, F 288 and F 289. Furthermore, as the applied voltages are at their minimum values at the time that these connection changes occur, the amount of arcing that takes place at contacts F 217, F 245, S 291 and S 292 is not very great. These contacts are provided with blow-out coils, however, to protect their contact surfaces against whatever arcing that does take place. With such an arrangement, the life of the apparatus is greatly extended.

The induction regulator employed in the system is preferably of the two pole type, i. e., 180 degrees of mechanical movement is the same as 180 degrees electrical movement. It is to be understood, however, that an induction regulator of a different pole number may be employed if desired. Also, the above described induction regulator control may be employed to vary the voltage applied to induction motors having more than two primary windings of different pole numbers or induction motors having only one winding of one pole number or one winding arranged to be connected to produce any number of different numbers of stator poles. Furthermore, this control may be employed for single phase induction motors or other types of alternating current motors such as commutator motors. In fact, the control may be employed wherever it is desired to obtain a gradual change in the value of alternating E. M. F.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A control system for a polyphase alternating current motor comprising; a source of polyphase alternating current; means for causing voltage, derived from said source and consisting of the combination of two voltages of constant value, to be applied to said motor, said means comprising two inductively related polyphase windings, the phase of one of said two voltages with respect to that of the other being dependent upon the relative position of said windings; means for causing relative movement of said windings to vary the value of the derived voltage; and means for causing the derived voltage to be substantially in phase with the source voltage when it becomes substantially equal thereto whereby the motor may be directly connected to the source when the derived voltage is substantially equal to the source voltage.

2. A control system for a polyphase alternating current motor comprising; a source of polyphase alternating current for said motor; and means for controlling the voltage applied to said motor, said means comprising relatively movable inductively related windings interposed between said motor and said source, said windings being arranged so that when in certain relative positions their voltages act in opposition to cause a low value of voltage to be applied to said motor for starting and when in certain other relative positions their voltages act cumulatively to cause full operating voltage to be applied to said motor, and means for causing said windings to be in their first mentioned relative positions upon starting said motor and for causing relative movement of said windings from such positions to said other relative positions to cause a gradual increase in the value of the voltage applied to said motor to full operating voltage.

3. A control system for a polyphase alternating current motor comprising; a source of polyphase alternating current for said motor; and means for controlling the voltage applied to said motor, said means comprising relatively movable inductively related windings interposed between said motor and said source, said windings being arranged so that when in certain relative positions their voltages act in opposition to cause a low value of voltage to be applied to said motor for starting and when in certain other relative positions their voltages act cumulative to cause the voltage applied to said motor to be of a value substantially equal to that of the source, means for causing said windings to be in their first mentioned relative positions upon starting said motor and for causing relative movement of said windings from such positions to said other relative positions to cause a gradual increase in the value of the voltage applied to said motor, and means for connecting said motor directly to said source upon said applied voltage reaching a value substantially equal to that of the source.

4. A control system for a polyphase alternating current motor comprising; a source of polyphase alternating current for said motor; and means for controlling the voltage applied to said motor, said means comprising a polyphase winding connected to the different phases of said source, an additional polyphase winding inductively related to said first winding and connected in series relation with said motor to said source, said windings being relatively movable, means for causing the relative positions of said windings to be such that the voltage induced in said additional winding acts in opposition to the source voltage to cause the voltage applied to said motor to be of a low value for starting, means for causing relative movement of said windings such that the value of said applied voltage is gradually increased, and additional means for determining the value of the voltage applied to said motor, said additional means causing the value of said applied voltage to be substantially equal to that of the source when said applied voltage is substantially in phase with said source voltage.

5. A control system for a polyphase alternating current motor comprising; a source of polyphase alternating current for said motor; a polyphase winding connected to the different phases of said source; an additional polyphase winding inductively related to said first winding and connected in series relation with said motor to said source, said windings being relatively movable; voltage transforming means interposed between said motor and said source; means for causing the relative positions of said windings to be such that the voltage induced in said additional winding is opposed to the source voltage and of a phase to cause a certain low value of voltage to be applied to said motor for starting; means for causing relative movement of said windings to cause a gradual change in the phase of said induced voltage such that the voltage applied to said motor is gradually increased, said transforming means causing said applied voltage to be substantially equal to said source voltage when said induced voltage becomes in phase with said source voltage; and means connecting said motor directly to said source when said applied voltage becomes substantially equal to said source voltage.

6. A control system for a polyphase alternating current motor comprising; a source of polyphase alternating current for said motor; a polyphase transformer connected to the different phases of said source; a polyphase winding also connected to the different phases of said source; an additional polyphase winding inductively related to the first polyphase winding and connected in series relation with said motor to the different phases of the secondary of said transformer, said windings being relatively movable; means for causing the relative positions of said windings to be such that the voltage induced in said additional winding is of a phase with respect to the voltage of the transformer secondary to cause a certain low value of voltage to be applied to said motor for starting; means for causing relative movement of said windings from said relative positions to cause a gradual change in the phase of said induced voltage such that the voltage applied to said motor is gradually increased until a condition is reached wherein said induced voltage is in phase with said secondary voltage, the transformation ratio of said transformer being such as to cause the value of the voltage then applied to said motor to be equal to that of the source voltage; and means for thereupon connecting said motor directly to said source.

7. A control system for a polyphase alternating current motor comprising; a source of polyphase alternating current for said motor; a polyphase transformer having its primary connected to the different phases of said source; an additional polyphase transformer having its secondary connected in series with said motor to the secondary of the first transformer; a polyphase winding connected to the different phases of said source; an additional polyphase winding inductively related to said first polyphase winding and connected across the primary of said additional transformer, said inductively related windings being adapted for relative rotative movement; means for causing the relative rotative positions of said related windings to be such that the voltage induced in said additional winding causes a voltage in the secondary of said additional transformer of a phase with respect to the voltage of the first transformer secondary to cause a certain low value of voltage to be applied to said motor for starting; means for causing relative rotative movement of said related windings from said relative positions to cause a gradual change in the phase of the additional transformer secondary voltage such that the voltage applied to said motor is gradually increased until a condition is reached wherein said additional transformer secondary voltage is in phase with the first transformer secondary voltage, the transformation ratios of said transformers being such as to cause the value of the voltage then applied to said motor to be equal to that of the source voltage; and switching mechanism for thereupon connecting said motor directly to said source.

8. A control system for a two-speed polyphase induction motor of the type wherein the two different speeds are obtained by operating with two different numbers of stator poles comprising; a source of polyphase alternating current for said motor; means for alternatively causing voltage derived from said source to be applied to said motor for operation on either pole number; and means for controlling the value of said applied voltage, said means comprising relatively movable inductively related windings interposed between said motor and said source and common to both pole numbers, said windings being arranged so that their voltages act in opposition when the windings are in certain relative positions and act cumulatively when the windings are in certain other relative positions, means for causing said windings to be in such relative positions upon application of voltage to said motor for operation on either pole number as to cause said applied voltage to be of low value, and means for thereafter causing such relative movement of said windings as to cause a gradual increase in the value of said applied voltage.

9. In combination, a polyphase induction motor having a primary winding, a source of polyphase alternating current, a polyphase step-down transformer having a primary and a secondary winding, a polyphase induction device having a primary and a secondary winding, means for connecting the primary windings of the transformer and the induction device to said source and the motor winding with the secondary winding of the induction device in circuit therewith across the secondary winding of the transformer, and means for causing the relative positions of the induction device primary and secondary windings, at the time that said circuit connections are established, to be such that said induction device secondary winding causes the voltage applied to the motor winding to be of a lower value than that of the transformer secondary voltage and for thereafter causing rotative movement of one of the windings of the induction device with respect to the other to a position where the voltage applied to the motor winding is of a higher value than that of the transformer secondary voltage.

10. In combination; a three phase induction motor having a primary winding; a source of three phase alternating current; a three phase step-down transformer having a primary and a secondary winding; a three phase step-up transformer having a primary and a secondary winding; a three phase induction device having a primary and a secondary winding, said induction device primary winding being rotatable with respect to the induction device secondary winding and the respective phase windings of the induction device secondary being connected across the respective primary phase windings of the step-up transformer; means for connecting the primary windings of both the step-down transformer and the induction device to the source and the motor winding with the secondary winding of the step-up transformer in circuit therewith across the secondary winding of the step-down transformer; means for causing the position of the induction device primary winding with respect to its secondary winding, at the time that said circuit connections are established, to be such that the voltage induced in the secondary winding of the step-up transformer opposes that of the secondary winding of the step-down transformer, thus causing voltage of low value to be applied to the motor winding for starting, and for thereafter causing rotative movement of the induction device primary winding to cause the step-up transformer secondary voltage to gradually change in phase from its position of opposition to one of assisting the step-down transformer secondary voltage, thus causing a gradual increase in the value of said applied voltage; and means for connecting the motor winding directly to the source upon said applied voltage reaching a value substantially equal to that of the source voltage.

11. In combination; a two-speed polyphase induction motor having fast speed and slow speed connections; means for causing polyphase alternating E. M. F. of low value to be applied to the motor fast speed connections during starting and for thereafter causing a gradual increase in the value of the E. M. F. and, upon a change from fast speed to slow speed motor connections for slowing down, for causing polyphase alternating E. M. F. of low value to be applied to the motor slow speed connections and for thereafter causing a gradual increase in the value of the E. M. F., said means comprising relatively movable inductively related polyphase windings; and means for causing relative movement of said windings and for causing said change from fast to slow speed motor connections.

12. In combination; a two-speed polyphase induction motor of the type wherein the different speeds are obtained by operating with two different numbers of stator poles; a source of polyphase alternating current; means for connecting the motor for operation on the lower number of stator poles for starting; means for changing from the lower to the higher number of stator poles for slowing down; means for causing voltage, derived from said source, of a lower value than that of the source voltage to be applied to the motor upon its connection for operation on the lower pole number for starting and upon the change from the lower to the higher pole number for slowing down, said third named means comprising a stationary polyphase winding and a rotatable polyphase winding inductively associated with the stationary winding; and means for causing rotative movement of said rotatable winding in one direction upon the connection of the motor for lower pole number operation and for causing rotative movement of said rotatable winding in the other direction upon the connection of the motor for higher pole number operation, said windings causing a gradual increase in the value of said derived voltage for starting on the lower pole number upon said rotative movement of the rotatable winding in said one direction and for slowing down on the higher pole number upon said rotative movement of the rotatable winding in said other direction.

13. In combination; a two-speed polyphase induction motor of the type wherein the different speeds are obtained by operating with two different numbers of stator poles; a source of polyphase alternating current for the motor; means for causing the operation of the motor on the lower number of stator poles to obtain fast speed; means for changing from the lower to the higher number of stator poles for slowing down; means for causing voltage, derived from said source, of a lower value than that of the source voltage to be applied to the motor upon said change from the lower to the higher pole number, said third named means comprising relatively movable inductively related polyphase windings for causing, by their relative movement, a gradual increase in the value of said derived voltage; and means for causing said relative movement of said inductively related windings and for causing the operation of said second named means.

14. In combination; a two-speed polyphase induction motor of the type wherein the different speeds are obtained by operating with two different numbers of stator poles, a source of polyphase alternating current for the motor, means for causing the starting of the motor on the higher number of stator poles, means for changing from the higher to the lower number of stator poles to bring the motor up to fast speed, and means for causing voltage, derived from said source, of a lower value than that of the source voltage to be applied to the motor and thereafter a gradual increase in the value of the derived voltage for starting on the higher pole number and upon said change from the higher to the lower pole number to bring the motor up to fast speed, said last named means comprising relatively movable inductively related polyphase windings.

15. In combination; a two-speed polyphase induction motor of the type wherein the different speeds are obtained by operating with two different numbers of stator poles; a source of polyphase alternating current for the motor; means for causing the starting of the motor on either pole number; means for changing from the higher to the lower pole number to bring the mtor up to fast speed when it has been started on the higher pole number and for changing from the lower to the higher pole number for slowing down when it is operating on the lower pole number; and means for causing voltage, derived from said source, of a lower value than that of the source voltage to be applied to the motor and thereafter a gradual increase in the value of said derived voltage upon starting on either pole number, upon said change from the higher to the lower pole number to bring the motor up to fast speed and upon said change from the lower to the higher pole number for slowing down, said last named means comprising relatively movable inductively related polyphase windings.

16. In combination; an alternating current motor; a source of alternating current for said motor; an induction device for causing a variable voltage derived from said source to be applied to said motor, said induction device comprising a stationary winding and an additional winding inductively associated therewith and adapted for rotative movement with respect thereto in each of two directions from a neutral point; a motor for causing said rotative movement of said additional winding; and means for bringing said motor to a stop upon its having caused rotative movement of said additional winding for a certain distance from neutral in one of said directions and for a certain distance from neutral in the other direction.

17. In combination; an alternating current motor; a source of alternating current for said motor; an induction device for causing a variable voltage derived from said source to be applied to said motor, said induction device comprising a stationary winding and an additional winding inductively associated therewith, said additional winding being adapted for rotative movement with respect to said stationary winding from a neutral point; means for causing said rotative movement and for causing the return of said additional winding to said neutral point; and dash pot mechanism for bringing said additional winding to a stop at said neutral point upon its being returned by the operation of said means.

18. In combination; an alternating current motor; a source of alternating current for said motor; an induction device for causing a variable voltage derived from said source to be applied to said motor, said induction device comprising a stationary winding and an additional winding inductively associated therewith, said additional winding being adapted for rotative movement with respect to said stationary winding from a neutral point; means for causing said rotative movement and for causing the return of said additional winding to said neutral point; and dash pot mechanism for limiting the speed of said rotative movement of said additional winding and for bringing said additional winding to a stop at said neutral point upon its being returned by the operation of said means.

19. In combination; an alternating current motor; a source of alternating current for said motor; an induction device for causing a variable voltage derived from said source to be applied to said motor, said induction device comprising a stationary winding and an additional winding inductively associated therewith and adapted for rotative movement with respect thereto in each of two directions from a neutral point; means for causing said rotative movement of said additional winding and for causing it to be returned to said neutral point from either direction; and dash pot mechanism for bringing said additional winding to a stop at said neutral point upon its being returned from either direction by the operation of said means.

20. In combination; an alternating current motor; a source of alternating current for said motor; an induction device for causing a variable voltage derived from said source to be applied to said motor, said induction device comprising a stationary winding and an additional winding inductively associated therewith and adapted for rotative movement with respect thereto in each of two directions from a neutral point; means for causing said rotative movement of said additional winding and for causing it to be returned to said neutral point from either direction; and dash pot mechanism for limiting the speed of said rotative movement of said additional winding in either direction and for bringing said additional winding to a stop at said neutral point upon its being returned from either direction by the operation of said means.

21. In combination; an alternating current motor; a source of alternating current for said motor; an induction device for causing a variable voltage derived from said source to be applied to said motor, said induction device comprising a stationary winding and an additional winding inductively associated therewith and adapted for rotative movement with respect thereto in each of two directions; a motor for causing said rotative movement of said additional winding in each of said directions from a neutral point, for causing rotative movement of said additional winding from the position to which it has moved in either of said directions in the other direction past said neutral point and for causing the return of said additional winding from the position to which it has moved in either direction to said neutral point; means for bringing said motor to a stop upon its having caused rotative movement of said additional winding for a certain distance from neutral in one of said directions and for a certain distance from neutral in the other direction; and dash pot mechanism for limiting the speed of rotative movement of said additional winding in each direction and for bringing said additional winding to a stop at said neutral point upon its being returned by the operation of said motor.

22. In combination; an alternating current motor; a source of alternating current for said motor; an induction device for causing a variable voltage derived from said source to be applied to said motor, said induction device comprising a stationary winding and an additional winding inductively associated therewith and adapted for rotative movement with respect thereto; means for causing rotative movement of said additional winding in one of two directions from a neutral to a certain point and for causing rotative movement of said additional winding in the other direction from said certain point past said neutral point to another point; and means for causing the speed of movement of said additional winding from said certain point to said neutral point during its movement to said other point to be greater than that from said neutral point to said certain point.

23. In combination; an alternating current motor; a source of alternating current for said motor; an induction device for causing a variable voltage derived from said source to be applied to said motor, said induction device comprising a stationary winding and an additional winding inductively associated therewith and adapted for rotative movement with respect thereto; means for causing rotative movement of said additional winding in one of two directions from a neutral to a certain point and for causing rotative movement of said additional winding in the other direction from said certain point past said neutral point to another point; and means for damping the movement of said additional winding as it passes through neutral during movement from said certain point to said other point.

24. In combination; an alternating current motor; a source of alternating current for said motor; an induction device for causing a variable voltage derived from said source to be applied to said motor, said induction device comprising a stationary winding and an additional winding inductively associated therewith and adapted for rotative movement with respect thereto; means for causing rotative movement of said additional winding in one of two directions from a neutral to a certain point and for causing rotative movement of said additional winding in the other direction from said certain point past said neutral point to another point; means for causing the speed of movement of said additional winding from said certain point to said neutral point during its movement to said other point to be greater than that from said neutral point to said certain point; and dash pot mechanism for reducing the speed of movement of said additional winding as it passes said neutral point.

25. In combination; an alternating current motor; a source of alternating current for said motor; an induction device for causing a variable voltage derived from said source to be applied to said motor, said induction device comprising a stationary winding and an additional winding inductively associated therewith and adapted for rotative movement with respect thereto in one of two directions from a neutral point to a certain point and in the other of said directions from said neutral point to another point; a motor operable upon the application of voltage thereto to cause said rotative movement of said additional winding; means for causing the application of voltage of a certain value to said motor to cause it to effect said rotative movement; and means for reducing the value of the voltage applied to said motor with said additional winding in either said certain or said other position.

26. In combination; an alternating current motor; a source of alternating current for said motor; means for causing the application to said motor of voltage derived from said source; relatively movable inductively related windings for causing, when in neutral position, said derived voltage to be of a certain value lower than that of said source voltage and, by relative movement, a gradual increase in the value of said derived voltage; means for causing said windings to be in neutral position upon starting said motor and for thereafter causing said relative movement of said windings, said second named means causing said windings to be restored to neutral position upon the application of voltage to said motor being discontinued for stopping; and means for causing the application of voltage to said motor to be discontinued.

27. In combination; an alternating current motor; a source of alternating current; means for causing the application to said motor of voltage derived from said source; relatively movable inductively related windings for causing, when in neutral position, said derived voltage to be of a certain value lower than that of said source voltage and, by relative movement, a gradual increase in the value of said derived voltage; an additional motor for causing said windings to be in neutral position upon starting said first named motor and for thereafter causing said relative movement of said winding, said additional motor causing said windings to be restored to neutral position upon the application of voltage to said first named motor being discontinued for stopping; means for causing the discontinuation of the application of voltage to said first named motor; and means for causing the energization of said additional motor to effect said rotative movement and restoration to neutral of said windings.

28. In combination; an alternating current motor; a source of alternating current; means for causing the application to said motor of voltage derived from said source; relatively movable inductively related windings for causing, when in neutral position, said derived voltage to be of a certain value lower than that of said source voltage and, by relative movement, a gradual increase in the value of said derived voltage; an additional motor for causing said windings to be in neutral position upon starting said first named motor and for thereafter causing said relative movement of said windings, said additional motor causing said windings to be restorted to neutral position upon the application of voltage to said first named motor being discontinued for stopping; means for causing the discontinuation of the application of voltage to said first named motor; and means for causing the energization of said additional motor to effect said rotative movement and restoration to neutral of said windings and for causing the deenergization of said additional motor upon said windings being restored substantially to neutral position.

29. In combination; an alternating current motor; a source of alternating current; means for causing the application to said motor of voltage derived from said source; relatively movable inductively related windings for causing, when in neutral position, said derived voltage to be of a certain value lower than that of said source voltage and, by relative movement, a gradual increase in the value of said derived voltage; an additional motor for causing said windings to be in neutral position upon starting said first named motor and for thereafter causing said relative movement of said windings, said additional motor causing said windings to be restored to neutral position upon the application of voltage to said first named motor being discontinued for stopping; means for causing the discontinuation of the application of voltage to said first named motor; means for causing the energization of said additional motor to effect said rotative movement and restoration to neutral of said windings and for causing the deenergization of said additional motor upon said windings being restored substantially to neutral position; and means for causing the deenergization of said additional motor in the event that it does not effect the restoration of said windings substantially to neutral position within a predetermined period of time.

30. In combination; a three phase induction motor having a fast speed primary winding and a slow speed primary winding; a three phase step-down auto transformer arranged to provide a primary and high and low voltage secondaries; a three phase step-up auto transformer arranged to provide a primary and high and low voltage secondaries; a three phase induction device having a primary and a secondary winding, the induction device primary being adapted for rotative movement with respect to the induction device secondary winding and the respective phases of the induction device secondary being connected across the respective phases of the step-up transformer primary; a three phase torque motor for imparting rotative movement to the induction device primary; means for connecting the primaries of the induction device and the step-down transformer to the source with the respective phases of the induction motor fast speed primary connected in circuit with the respective phases of the step-up transformer low voltage secondary across the respective phases of the step-down transformer high voltage secondary, the position of the induction device primary winding with respect to its secondary winding being such at this time that the voltage induced in the low voltage secondary of the step-up transformer opposes that of the high voltage secondary of the step-down transformer, thus causing voltage of low value to be applied to the induction motor fast speed primary winding for starting; means for causing voltage derived from said source to be applied to said torque motor in such manner as to cause it to impart rotative movement to the induction device primary in a direction to cause the step-up transformer low voltage secondary voltage to gradually change in phase from its position of opposition to one of assisting the step-down transformer high voltage secondary voltage, thus causing a gradual increase in the value of the voltage applied to the induction motor fast speed winding; switching means, operated by the torque motor upon the voltage applied to the induction motor fast speed winding reaching a value substantially equal to that of the source voltage, for connecting the induction motor fast speed winding directly to the source; additional switching means operated by the torque motor, and means for causing voltage derived from said source to be applied to said torque motor in such manner as to cause its reverse rotative movement to disconnect the induction motor fast speed winding from the source, to permit the induction device to again assume control, to return the induction device primary to its orginal position, to cause the operation of said additional switching means to disconnect the induction motor fast speed winding and to connect the respective phases of the slow speed winding of the induction motor in circuit with the respective phases of the step-up transformer high voltage secondary across the respective phases of the step-down transformer low voltage secondary, thus causing voltage of a value, lower than that initially applied to the induction motor fast speed winding, to be applied to the induction motor slow speed winding for regenerative braking and to thereafter cause the continued reverse rotative movement of the induction device primary to increase the value of the voltage applied to the induction motor slow speed winding.

31. In combination; a three phase induction motor having a fast speed primary winding and a slow speed primary winding; a three phase step-down auto transformer arranged to provide a primary and high and low voltage secondaries; a three phase step-up auto transformer arranged to provide a primary and high and low voltage secondaries; a three phase induction device having a primary and a secondary winding, the induction device primary being adapted for rotative movement with respect to the induction device secondary winding and the respective phases of the induction device secondary being connected across the respective phases of the step-up transformer primary; a three phase torque motor for imparting rotative movement to the induction device primary; means for connecting the primaries of the induction device and the step-down transformer to the source with the respective phases of the induction motor fast speed primary connected in circuit with the respective phases of the step-up transformer low voltage secondary across the respective phases of the step-down transformer high voltage secondary, the position of the induction device primary winding with respect to its secondary winding being such at this time that the voltage induced in the low voltage secondary of the step-up transformer opposes that of the high voltage secondary of the step-down transformer, thus causing voltage of low value to be applied to the induction motor fast speed primary winding for starting; means for causing voltage derived from said source to be applied to said torque motor in such manner as to cause it to impart rotative movement to the induction device primary in a direction to cause the step-up transformer low voltage secondary voltage to gradually change in phase from its position of opposition to one of assisting the step-down transformer high voltage secondary voltage, thus causing a gradual increase in the value of the voltage applied to the induction motor fast speed winding; switching means, operated by the torque motor upon the voltage applied to the induction motor fast speed winding reaching a value substantially equal to that of the source voltage, for connecting the induction motor fast speed winding directly to the source; additional switching means operated by the torque motor; means for causing voltage derived from said source to be applied to said torque motor in such manner as to cause its reverse rotative movement to disconnect the induction motor fast speed winding from the source, to permit the induction device to again assume control, to return the induction device primary to its original position, to cause the operation of said additional switching means to disconnect the induction motor fast speed winding and to connect the respective phases of the induction motor slow speed winding in circuit with the respective phases of the step-up transformer high voltage secondary across the respective phases of the step-down transformer low voltage secondary, thus causing voltage of a value, lower than that initially applied to the induction motor fast speed winding, to be applied to the induction motor slow speed winding for regenerative braking and to thereafter cause the continued reverse rotative movement of the induction device primary to increase the value of the voltage applied to the induction motor slow speed winding; means responsive to the speed of the induction motor for causing the discontinuance of the application of voltage thereto upon the induction motor's speed being reduced to a certain value; means for causing voltage derived from said source to be applied to the torque motor in such manner as to cause it to return the induction device primary to its original position and for causing the voltage applied to said torque motor to be discontinued upon the induction device primary being returned substantially to its original position; and means for bringing the induction device primary to a stop in its original position.

In testimony whereof, we have signed our names to this specification.

JACOB D. LEWIS.
BENJAMIN N. JONES.
ARTHUR H. SCHLAF.